(12) United States Patent
Marsland et al.

(10) Patent No.: US 8,423,892 B1
(45) Date of Patent: Apr. 16, 2013

(54) SYSTEM AND METHOD FOR MONITORING PLAYER INTERACTIONS WITH BRANDED VIRTUAL OBJECTS IN A VIRTUAL ENVIRONMENT

(75) Inventors: John Marsland, San Francisco, CA (US); Revant Kapoor, San Francisco, CA (US); Emily Anadu, San Francisco, CA (US); Matt Levine, San Francisco, CA (US); Edmund Leo, San Francisco, CA (US); Matthew Adam Ocko, Palo Alto, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/174,771

(22) Filed: Jun. 30, 2011

Related U.S. Application Data

(63) Continuation of application No. 13/174,765, filed on Jun. 30, 2011.

(60) Provisional application No. 61/475,128, filed on Apr. 13, 2011.

(51) Int. Cl.
*G06F 3/00* (2006.01)

(52) U.S. Cl.
USPC .......................................... 715/706; 446/175

(58) Field of Classification Search .............. 463/40–42; 446/175; 715/706
See application file for complete search history.

(56) References Cited

U.S. PATENT DOCUMENTS

| | | | |
|---|---|---|---|
| 6,826,523 B1 | 11/2004 | Guy et al. | |
| 6,910,186 B2 * | 6/2005 | Kim | 715/706 |
| 6,943,728 B2 | 9/2005 | Han et al. | |
| 6,954,728 B1 * | 10/2005 | Kusumoto et al. | 705/14.4 |
| 7,425,169 B2 * | 9/2008 | Ganz | 446/175 |
| 7,442,108 B2 * | 10/2008 | Ganz | 446/175 |
| 7,465,212 B2 * | 12/2008 | Ganz | 446/175 |
| 7,534,157 B2 * | 5/2009 | Ganz | 446/175 |
| 7,542,920 B1 | 6/2009 | Lin-hendel | |
| 7,568,964 B2 * | 8/2009 | Ganz | 446/175 |
| 8,190,733 B1 | 5/2012 | Hoffman et al. | |
| 2002/0090985 A1 | 7/2002 | Tochner et al. | |

(Continued)

FOREIGN PATENT DOCUMENTS

WO  WO-2012141919 A1  10/2012

OTHER PUBLICATIONS

"U.S. Appl. No. 13/174,765, Examiner Interview Summary mailed Mar. 6, 2012", 3 pgs.

(Continued)

*Primary Examiner* — Masud Ahmed

(74) *Attorney, Agent, or Firm* — Schwegman, Lundberg & Woessner, P.A.

(57) ABSTRACT

A system, computer-readable storage medium storing at least one program, and a computer-implemented method for monitoring player interactions with branded virtual objects in a virtual environment are presented. A game instance of a computer-implemented multiplayer online game is generated, where the game instance is associated with a virtual environment of a first player. A graphical user interface is provided to a second player, where the graphical user interface displays at least one branded virtual object, and where the branded virtual object corresponding to a real-world brand. Player engagement data is generated based on the second player's interaction with the branded virtual object in the virtual environment of the first player. The player engagement data of the second player is stored in a database.

20 Claims, 16 Drawing Sheets

U.S. PATENT DOCUMENTS

| | | | |
|---|---|---|---|
| 2003/0156134 | A1* | 8/2003 | Kim .............................. 345/753 |
| 2004/0148221 | A1 | 7/2004 | Chu |
| 2005/0137015 | A1* | 6/2005 | Rogers et al. .................... 463/42 |
| 2005/0137958 | A1 | 6/2005 | Huber et al. |
| 2005/0216346 | A1 | 9/2005 | Kusumoto et al. |
| 2006/0232605 | A1 | 10/2006 | Imamura |
| 2006/0242017 | A1 | 10/2006 | Libes et al. |
| 2007/0265933 | A1 | 11/2007 | Steigelfest |
| 2008/0071594 | A1 | 3/2008 | Morin |
| 2008/0102947 | A1 | 5/2008 | Hays et al. |
| 2008/0167106 | A1 | 7/2008 | Lutnick et al. |
| 2009/0063983 | A1 | 3/2009 | Amidon |
| 2009/0069078 | A1 | 3/2009 | Nguyen et al. |
| 2009/0247282 | A1 | 10/2009 | Cheng |
| 2009/0281926 | A1 | 11/2009 | Lin-hendel |
| 2010/0016080 | A1 | 1/2010 | Garden et al. |
| 2010/0016083 | A1 | 1/2010 | Bruce |
| 2010/0017283 | A1 | 1/2010 | Hamilton, II et al. |
| 2010/0023406 | A1 | 1/2010 | Bhogal et al. |
| 2010/0131355 | A1 | 5/2010 | Kitchen et al. |
| 2010/0161788 | A1 | 6/2010 | Boss et al. |
| 2010/0205035 | A1 | 8/2010 | Baszucki et al. |
| 2010/0273553 | A1 | 10/2010 | Zalewski |
| 2010/0332331 | A1 | 12/2010 | Etchegoyen |
| 2012/0066040 | A1 | 3/2012 | Farraro et al. |
| 2012/0264511 | A1 | 10/2012 | Marsland et al. |
| 2012/0264520 | A1 | 10/2012 | Marsland et al. |

OTHER PUBLICATIONS

"U.S. Appl. No. 13/174,765, Non Final Office Action mailed Jan. 5, 2012", 11 pgs.

"U.S. Appl. No. 13/244,933, filed Mar. 27, 2012 to Non Final Office Action mailed Dec. 27, 2011", 10 pgs.

"U.S. Appl. No. 13/244,933, Non Final Office Action mailed Dec. 27, 2011", 11 pgs.

Goad, L., "FarmVille McDonalds promotion is a glorified ad #notlovinit", [online]. AOL Inc., Oct. 7, 2010 [retrieved on Mar. 24, 2011]. Retrieved from the Internet: <URL: http://blog.games.com/2010/10/07/farmville-mcdonald-promotion-is-live-for-one-day-only/>, 2 pgs.

Osborne, J., "FarmVille gets the Farmers Insurance blimp to protect your crops, win a ride on it", [online]. AOL Inc., Oct. 18, 2010 [retrieved on Mar. 24, 2011]. Retrieved from the Internet: <URL: http://blog.games.com/2010/10/18/farmville-gets-the-farmers-insurance-blimp-to-protect-your-crops/>, 2 pgs.

"U.S. Appl. No. 13/174,765, Non Final Office Action Response filed Mar. 22, 2012 response to Non Final Office Action mailed Jan. 5, 2012", 9 pgs.

"U.S. Appl. No. 13/174,768, filed Oct. 1, 2012 to Non Final Office Action mailed May 31, 2012", 9 pgs.

"U.S. Appl. No. 13/174,768, Non Final Office Action mailed May 31, 2012", 10 pgs.

"U.S. Appl. No. 13/174,773, Non Final Office Action mailed May 11, 2012", 7 pgs.

"U.S. Appl. No. 13/244,713, filed Oct. 3, 2012 to Non Final Office Action mailed May 3, 2012", 15 pgs.

"U.S. Appl. No. 13/244,713, Examiner Interview Summary mailed Oct. 11, 2012", 3 pgs.

"U.S. Appl. No. 13/244,713, Non Final Office Action mailed May 3, 2012", 47 pgs.

"U.S. Appl. No. 13/244,933, Final Office Action mailed Oct. 25, 2012", 15 pgs.

"International Application Serial No. PCT/US2012/031480, International Search Report mailed Jun. 22, 2012", 6 pgs.

"International Application Serial No. PCT/US2012/031480, Written Opinion mailed Jun. 22, 2012", 8 pgs.

"U.S. Appl. No. 13/173,765, Final Office Action mailed Nov. 16, 2012", 14 pgs.

"U.S. Appl. No. 13/174,773, filed Nov. 12, 2012 to Non Final Office Action mailed May 11, 2012", 10 pgs.

* cited by examiner

US 8,423,892 B1

SYSTEM AND METHOD FOR MONITORING PLAYER INTERACTIONS WITH BRANDED VIRTUAL OBJECTS IN A VIRTUAL ENVIRONMENT

RELATED APPLICATIONS

This application is a continuation of U.S. application Ser. No. 13/174,765, filed Jun. 30, 2011, entitled "SYSTEM AND METHOD FOR PROVIDING BRANDED VIRTUAL OBJECTS IN A VIRTUAL ENVIRONMENT," which claims the benefit of U.S. Provisional Application No. 61/475,128, filed Apr. 13, 2011, entitled "PLATFORM FOR CREATING AND PROVIDING BRANDED VIRTUAL OBJECTS," each of which is herein incorporated by reference in its entirety.

TECHNICAL FIELD

The present disclosure relates to branded virtual objects in games and applications. In an example embodiment, an automated bidding platform is provided for digital incentives of computer-implemented online games including branded virtual objects.

BACKGROUND

Online advertising is largely dominated by advertisements placed on Web pages. Typically, advertisers provide an ad network with target keywords for an ad campaign, and the ad network selects an advertisement to place on a host Web page by determining which ad campaigns have keywords that best match the content of the Web page.

Additionally, some computer-implemented online games rely on advertising to generate at least a portion of the game's revenue. Unfortunately, these online games typically adopt ad bidding systems that have been optimized for advertising on Web pages, and thus do not take advantage of special features that are made available by online games.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Players of a computer-implemented virtual game may typically select virtual objects to place within a virtual environment of the virtual game. For example, in the virtual game CityVille by Zynga, Inc., a user (e.g., a player) may select virtual objects such as building structures and position them in a virtual city. Players may then interact with these virtual objects to complete jobs and earn virtual currency. Various example embodiments described herein provide an example system that may generate an advertising opportunity for placing a branded virtual object in the virtual game (e.g., CityVille).

For example, a player of the virtual game may indicate a desire to place a virtual café within a personal virtual environment of the virtual game, and may prefer to include a branded virtual café that resembles in some way a local café that the player likes to visit. Thus, based on a request from the player for a virtual café, the system may provide the player with one or more branded cafés that the player may place within the player's personal virtual environment. Each branded café may correspond to a brick and mortar business that has a physical presence outside of the virtual environment. Following on with the example branded café, the brick and mortar café may be a Starbucks Corp.™ coffee shop.

In some example embodiments, a game server may provide one or more advertisers with a user interface for creating campaigns for these branded virtual objects. For example, an advertiser may select an object category that may be associated with an unbranded virtual object, and may provide customization information that allows the advertiser to create a branded virtual object. This user interface may also allow the advertiser to provide campaign information such as a bid amount, a campaign budget, and a date range for the campaign. The game system may use this campaign information when facilitating an auction for an advertising opportunity to be presented to a player in a virtual game. The system may then monitor a selection of a particular branded object by the player and, for example, a location at which the branded virtual object is placed in the virtual environment.

Example System

Figure 1:
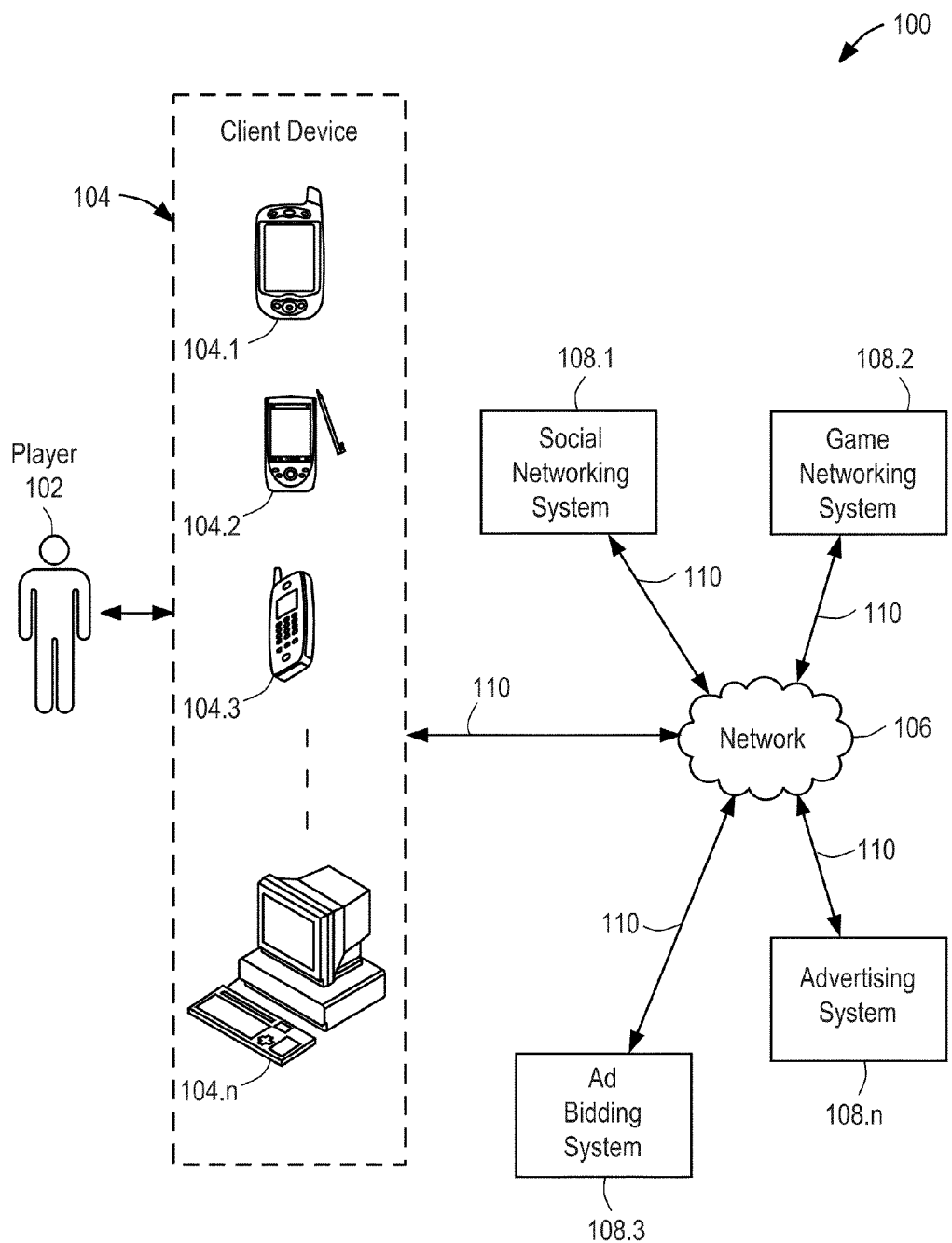
FIG. 1 illustrates an example of a system, according to some embodiments.

FIG. 1 illustrates an example of a system 100 for implementing various example embodiments. In some embodiments, the system 100 comprises a player 102, a client device 104, a network 106, a social networking system 108.1, a game networking system 108.2, an ad bidding system 108.3, and one or more advertising systems (e.g., an advertising system 108.n). The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1. The client device 104 may be any suitable computing device, such as a personal computer, laptop, cellular phone, smart phone, computing tablet, etc.

The social networking system 108.1 may include a network-addressable computing system that can host one or more social graphs (see for example FIG. 2), and may be accessed by the other components of system 100 either directly or via, the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player of the game networking system 108.2 to other players of the game networking system 108.2 that are encountering a common in-game obstacle.

The ad bidding system 108.3 may be a network-addressable computing system that can host or facilitate automated auctions for advertising opportunities within the virtual game. The advertising system 108.n may include a network-addressable computing system that can submit advertising offers to the ad bidding system 108.3. The ad bidding system 108.3 and the advertising system 108.n may be accessed by the other components of system 100 either directly or via the network 106.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, the ad bidding system 108.3, the advertising system 108.n, and the network 106.

Figure 2:
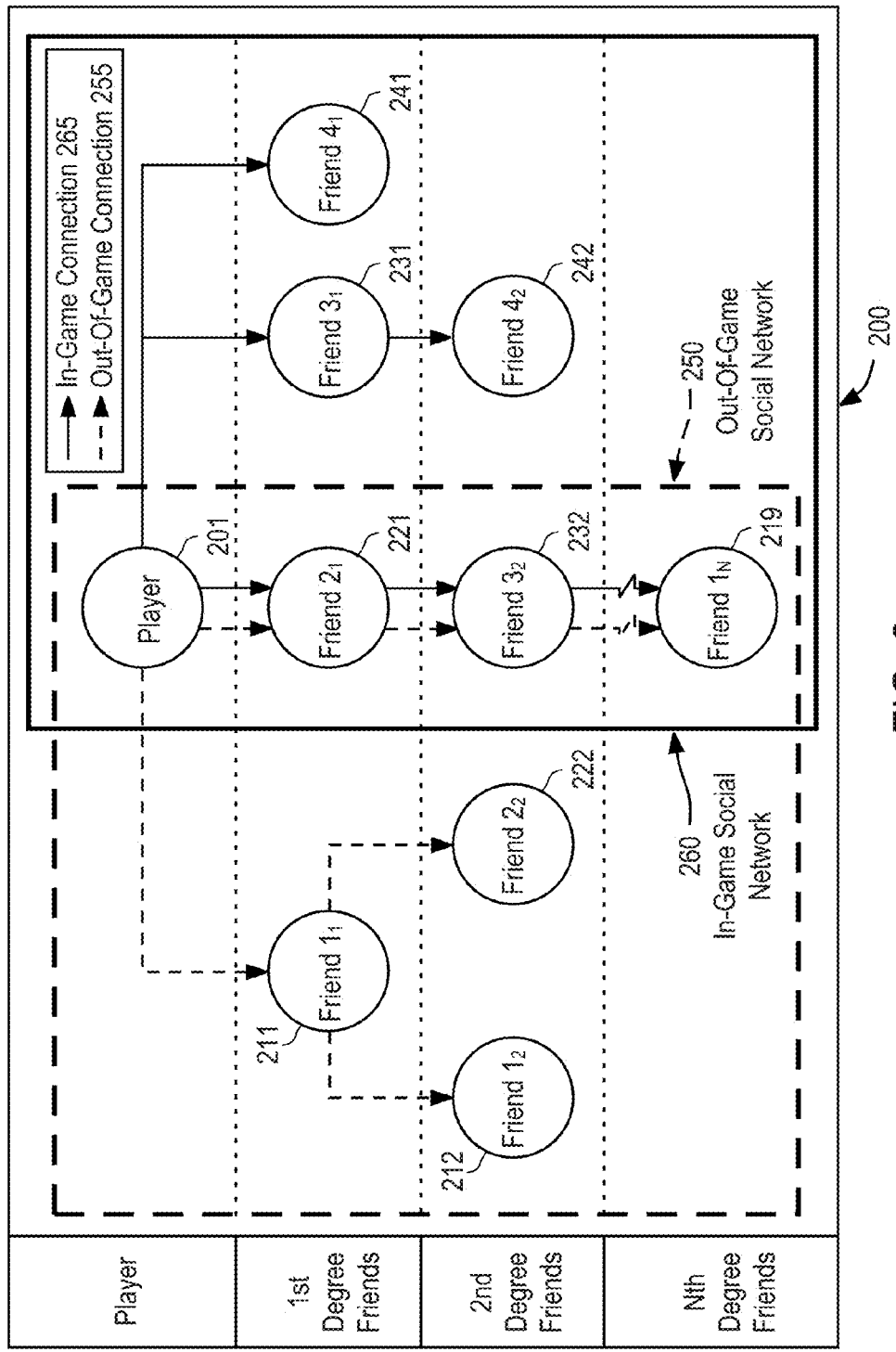
FIG. 2 shows an example of a social network within a social graph, according to some embodiments.

FIG. 2 shows an example of a social network within a social graph 200. Social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with the virtual game. In an example embodiment, each player may "build" their own virtual structures using branded virtual objects and/or unbranded virtual objects. When, for example, Player 201 visits the virtual environment of Friend 231, the virtual environment displayed to Player 201 includes banded objects selected and placed in that environment by Friend 231.

Example Player-Engaged Ad Placements

It is to be appreciated that the branded objects may be presented to a player for selection and inclusion in the player's virtual environment but sourced in different ways. For example the game networking system 108.2 may include a library of branded objects configured, for example, to correspond with virtual structures corresponding to brick and mortar structures (e.g., physical buildings). Each branded object may be configured to visually correspond with a physical structure, and advertisers (or companies) may pay for the opportunity of having their branded virtual object presented to the player for selection in the player's virtual environment. In an example embodiment, advertising opportunities to present a particular branded object to a player may be auctioned. Accordingly, in some embodiments, a bidding system facilitates accepting offers from one or more advertising entities for an advertising opportunity within a virtual game.

Figure 3:
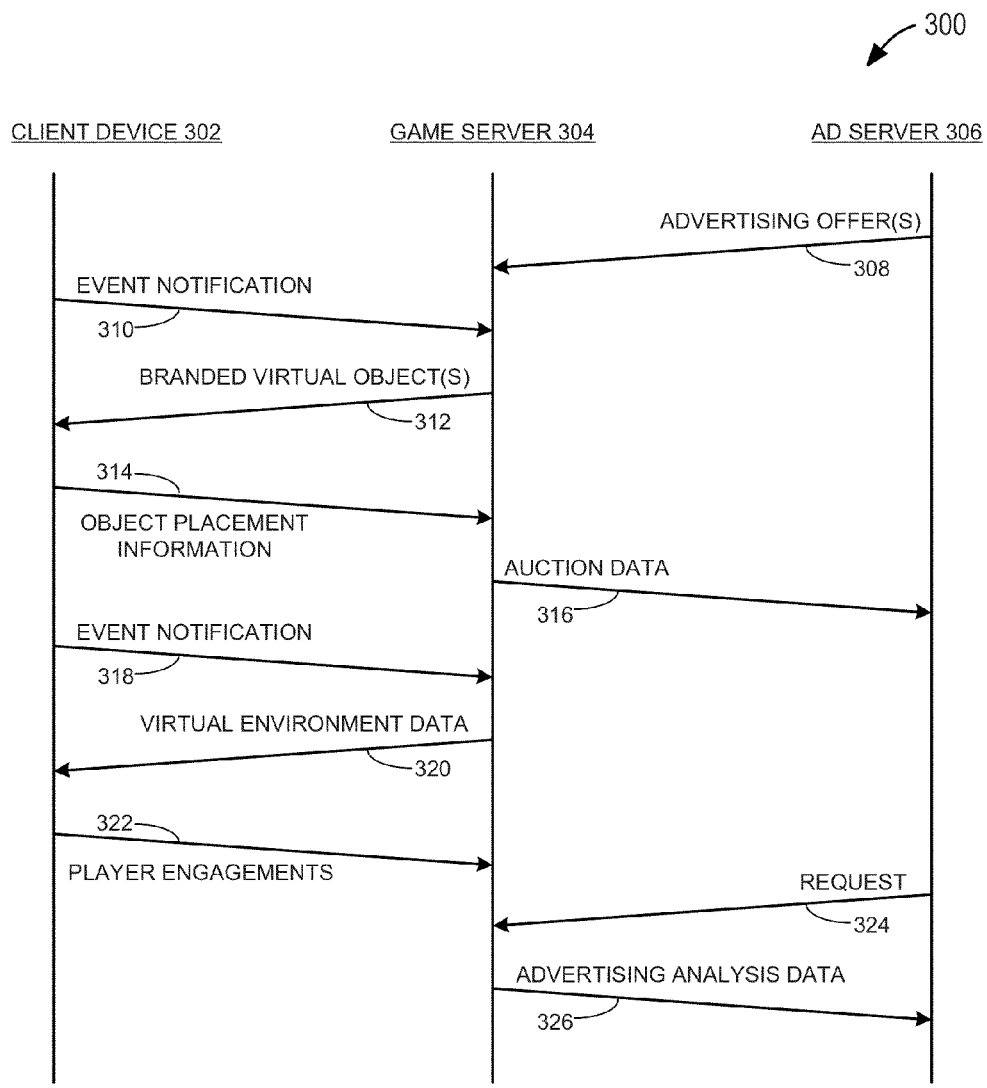
FIG. 3 shows a diagram illustrating example communications between example components of the system of FIG. 1, according to some embodiments.

FIG. 3 shows a diagram illustrating example communications 300 between components of an example system. Communications 300 may be performed using one or more of the components of example system 100 and, accordingly, is described by way of example with reference thereto. For example, client device 302 may correspond to client device 104, game server 304 may correspond to game networking system 108.2 and/or ad bidding system 108.3, and ad server 306 may correspond to advertising system 108.n.

In some example embodiments, the ad server 306 may send one or more advertising offers 308 to the game server 304, at which point the game server considers these advertising offers to satisfy an advertising opportunity (e.g., the game server may receive advertising offers from McDonald's™ and Burger King™ for an opportunity to place a branded virtual diner in a player's virtual environment). Moreover, a client device 302 may send an event notification 310 to the game server 304 (e.g., when a player using client device 302 browses through an in-game environment for a virtual diner to build within a personal virtual city of the virtual game). In response to the event notification 310, the game server 304 may create an advertising opportunity (e.g., an opportunity to present the player with one or more branded virtual diners to place in the player's personal virtual city). The game server 304 may, for example, select and send a set of one or more branded virtual objects 312 to the client device 302 based on an outcome of the auction. The client device 302 may present the player with the in-game environment that allows the player to select one of the branded virtual objects 312 (e.g., a virtual diner), and to place or position it in the player's personal virtual environment. The player may then subsequently be presented with further branded objects from the same or different advertisers (e.g., based on an outcome of further auctions) for placement in the player's virtual environment. For example, if the player selects a different object category of the in-game environment, the client device 302 may send another event notification 310 to the game server 304 for this new object category, and the game server 304 may send a new set of branded virtual objects 312 to the client device 302 for the selected object category. The new set of branded virtual objects 312 may be determined based on an outcome of an auction for the advertising opportunity.

In some example embodiments, when the player selects a branded virtual object to place within the player's personal virtual environment, the game server 304 may record selection of the particular branded object and, for example, advise the advertiser accordingly. In some example embodiments, the game server 304 may charge the advertiser a display bid amount for presenting a branded virtual object to the player. In other example embodiments, the game server 304 may charge the advertiser a placement bid amount when the player selects and places the branded virtual object within the player's virtual embodiment. In some embodiments, the game server 304 may send auction data 316 that indicates the winning bid to the ad server 306 that won the bid auction.

In various example embodiments, the player may visit a virtual environment of any other player (and other players may visit the virtual environment of this player). For example, the player may access a "Friend" menu of the virtual game to click on a friend's icon, and may select "visit" from a sub-menu to visit this friend's virtual environment. Then, the client device 302 may send an event notification 318 to the game server 304 indicating the player's request to visit the player's friend's virtual environment, and the game server 304 may respond by providing virtual environment data 320 to the client device 302. The virtual environment data 320 may include placement information for the friend's placed virtual objects, which may include branded virtual structures placed in the friend's virtual environment. Then, while the player is visiting the player's friend's virtual environment, the player may help the player's friend (e.g., when the player's friend is not playing the virtual game) by harvesting the player's friend's crops before they wither, or by collecting coins from the businesses and homes in the player's friend's virtual environment. In various example embodiments, the friend may have placed branded virtual structures within the friend's virtual environment, and the player may engage with a branded virtual structure (e.g., to complete an in-game job, or to collect coins from the branded virtual structure). Then, in response to the player engaging with the branded virtual structure, the client device 302 may send player engagement information 322 to the game server 304, which the game server 304 may use to gather advertising data that corresponds to the branded virtual structure for the advertiser.

In some embodiments, the ad server 306 may send a request 324 to the game server 304 for advertising analysis data pertaining to one or more advertising offers, and the game server 304 may send advertising analysis data 326 to the ad server 306. The advertising analysis data 326 may relate to a plurality of different bidding opportunities, data on the number of display bids or placement bids won by the advertiser, data on the number of times players selected the advertiser's branded virtual object, and/or the like. The advertising analysis data 326 may also include a distance between the branded virtual object and a particular virtual object of the virtual game (e.g., a competitor's branded virtual object), classification information for other virtual objects within a determinable distance to the branded virtual object, and the like. The advertising analysis data 326 may also include player engagement data indicating player-interactions with the branded virtual object, and data for any event related thereto.

Figure 4A:
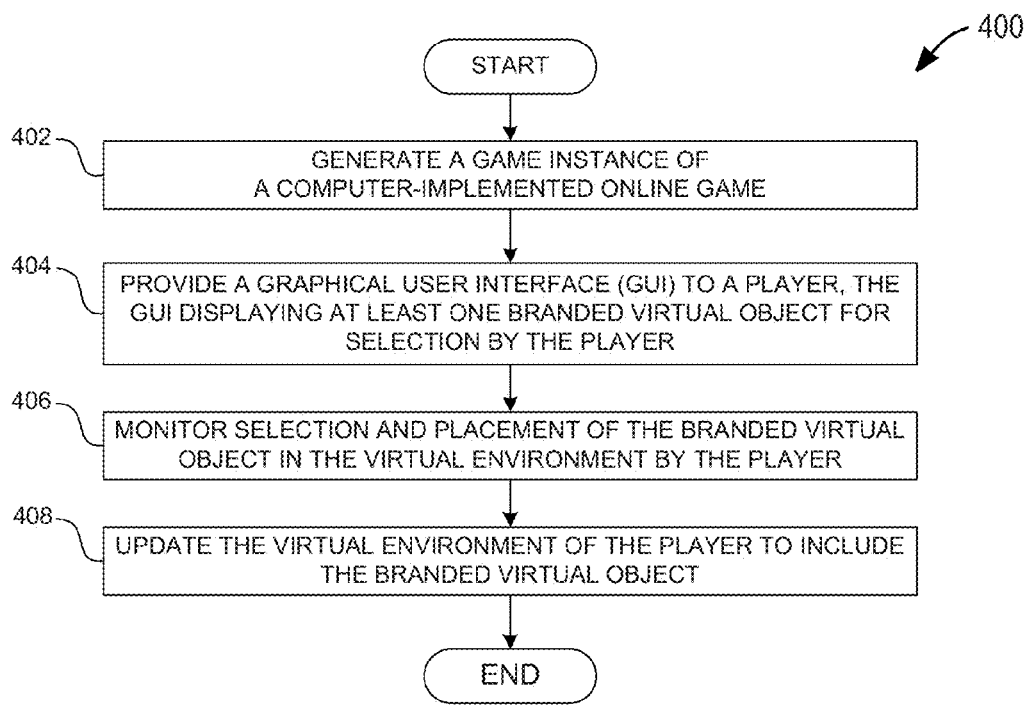
FIG. 4A shows a flowchart illustrating an example method for facilitating the selecting and placing of a branded virtual object in a virtual game, according to some embodiments.

FIG. 4A shows a flowchart illustrating an example method 400 for facilitating the selecting and placing of a branded virtual object in a virtual game. In some embodiments, the method 400 may be performed using the game networking system 108.2 and/or the ad bidding system 108.3, the method 400 may perform communications 300, and, accordingly, is described by way of example with reference thereto. In some example embodiments, the method 400 presents the player with an option to select a branded virtual object for placement within the player's virtual environment (e.g., placing a virtual structure in a virtual city).

The method 400 may begin, at operation 402, by generating a game instance of the virtual game, which may be a computer-implemented multiplayer online game. Also, the game instance may be uniquely associated with the virtual environment of the player. At operation 404, the method 400 may provide a graphical user interface (GUI) to the player. This GUI may display at least one branded virtual object that the player may select for placement in the player's virtual environment, where the branded virtual object may correspond to a real-world brand.

In some example embodiments, this branded virtual object may correspond to a winning bid in an auction for presentment of the branded virtual object to the player. As an example, the GUI may display an in-game menu that includes menu positions for five virtual objects, and at least one of these menu positions may display a branded virtual object that the player may select. Further, the ad bidding system 108.3 may host an auction for presentment of the branded virtual object at a menu position of the GUI. Then, the method 400 may generate the GUI so that this menu position displays a branded virtual object that corresponds to the winning bid that, for example, may represent a McDonald's™ fast-food diner. In some example embodiments, different menu positions of the GUI may display branded virtual objects that may correspond to different real-world brands. For example, at least two of the brands displayed in the GUI may correspond to competing real-world brands (e.g., McDonald's™ and Burger King™).

At operation 406, the method 400 may monitor the player's selection for a branded virtual object, and may monitor the placement position of the player's virtual environment at which the player places the branded virtual object. For example, the method 400 may monitor the player's in-game event information (e.g., from the event notification 310 or 318 of FIG. 3) to determine that the player selected the McDonald's branded virtual object. Further, the method 400 may also monitor this event information to determine a placement position of the player's virtual environment at which the player located the McDonald's branded virtual object. Then, at operation 408, the method 400 may update the player's virtual environment to include the branded virtual object. The method 400 may include this branded virtual object at the placement position of the virtual environment indicated by the player.

In some example embodiments, at operation 404, the method 400 may determine a branded virtual object to present to the player by accessing a database that includes a plurality of branded virtual objects. The method 400 may, for example, retrieve a branded virtual object that corresponds to a successful bidder that bids in the auction, and may present this branded virtual object to the player in the GUI for selection and placement in the virtual environment. This branded virtual object may correspond to a virtual building for placement in the virtual environment, or may correspond to a virtual vehicle that may traverse virtual roads of the virtual environment.

The virtual game may also include a plurality of un-branded virtual objects for selective placement in the virtual environment (e.g., the player may select an un-branded virtual object using the GUI, and may place this un-branded virtual object in the player's virtual environment). The un-branded virtual object may have a predefined shape and dimension, and may have associated object parameters. In some example embodiments, a branded virtual object may be associated with an un-branded virtual object (e.g., the branded virtual object and the un-branded virtual object may have a matching object category), and the branded virtual object may have associated parameters that correspond to the un-branded virtual object. Furthermore, a branded virtual object may have a predefined shape, predetermined dimensions, and object parameters associated with the un-branded object.

In some example embodiments, the database may include a selection count for branded virtual objects and unbranded virtual objects. Thus, if the player selects a branded virtual object from the GUI, the method 400 may update (e.g., increment) a branded virtual object selection count. Similarly, if the player selects an un-branded virtual object from the GUI, the method 400 may update (e.g., increment) an un-branded virtual object selection count. Further, the database may include a view count and an engagement count for branded virtual objects and unbranded virtual objects. For example, when the player or a guest player (e.g., another player of the virtual game that views the player's virtual environment) accesses the player's virtual environment, the guest player may be presented with a plurality of branded virtual objects at various placement positions of the player's virtual environment. Thus, when the player, or the guest player, accesses the player's virtual environment, the method 400 may update (e.g., increment) the branded object view count for a branded virtual object that is displayed in the virtual environment. Similarly, if the player, or the guest player, interacts with the branded virtual object, the method 400 may update (e.g., increment) a branded object engagement count for the branded virtual object. Further, when the guest player interacts with the branded virtual object in the host-player's virtual environment, the method 400 may provide an in-game reward to the player and/or the guest player.

Figure 4B:
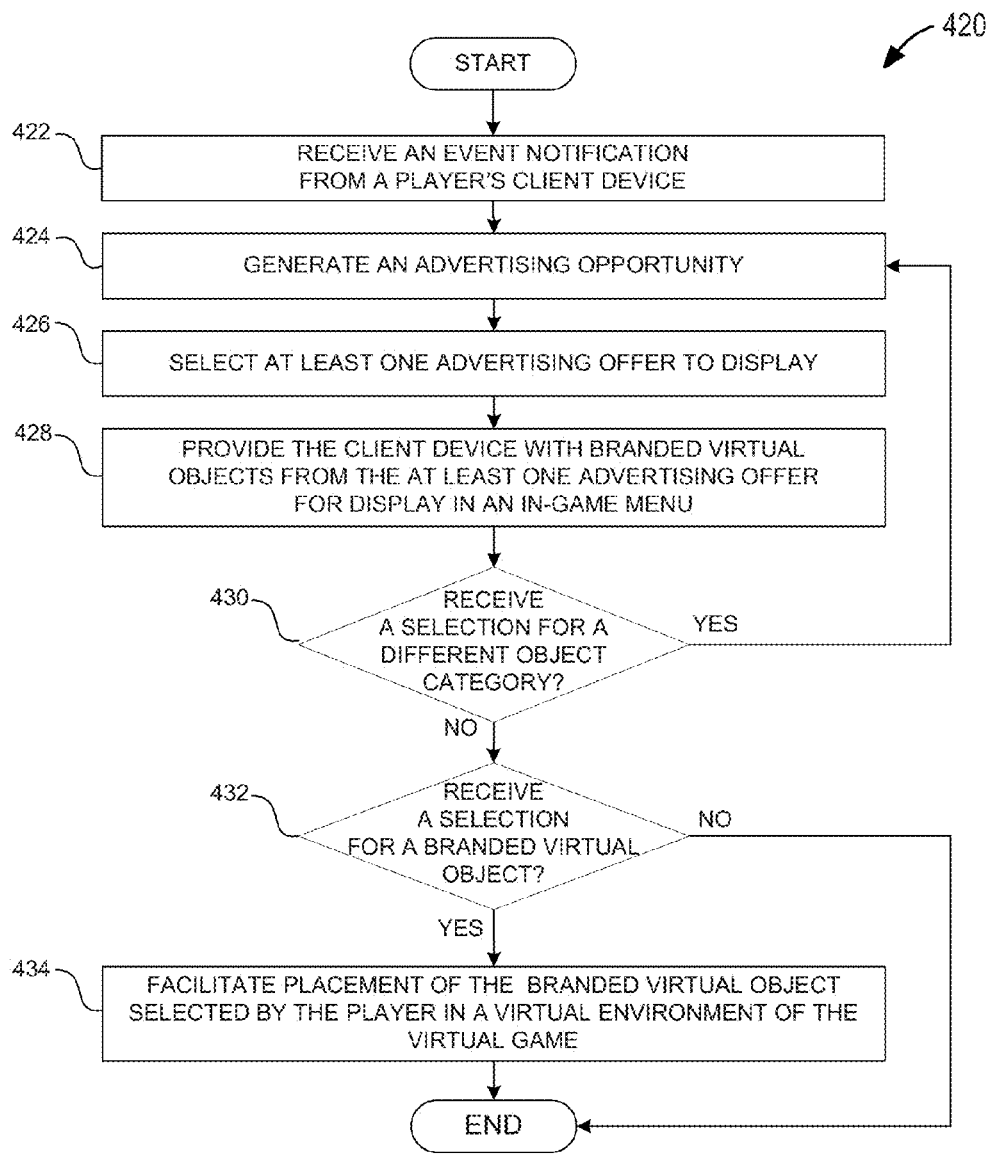
FIG. 4B shows a flowchart illustrating an example method for processing an advertising opportunity associated with a player's request for a virtual object of a computer-implemented virtual game, according to some embodiments.

FIG. 4B shows a flowchart illustrating an example method 420 for processing an advertising opportunity associated with a player's request for a virtual object of the virtual game. In an example embodiment, advertising opportunities are made and fulfilled on-the-fly while the game is in progress or being played. In some embodiments, the method 420 may be performed using the game networking system 108.2 and/or the ad bidding system 108.3, the method 420 may perform communications 300, and, accordingly, is described by way of example with reference thereto. In some example embodiments, the method 420 performs an auction to fulfill an advertising opportunity for presenting the player with an option to select a branded virtual object for placement within the player's virtual environment (e.g., placing a virtual structure in a virtual city). For example, the method 420 may correspond to operation 404 of FIG. 4A.

The method 420 may begin, at operation 422, by receiving an event notification (e.g., the event notification 310) from a player's client device (e.g., the client device 302). In some example embodiments, this event notification from operation 422 may correspond to the player navigating through object categories of the virtual environment to view virtual objects (e.g., virtual buildings providing different products) to place in the player's virtual environment. When the player selects an object category, the client device 302 may send a corresponding event notification 310 to the game server 304.

At operation 424, the method 420 may generate an advertising opportunity based on the event notification. For example, the method 420 may generate an advertising opportunity for a selected object category, and may generate opportunity constraints based on at least one of the following: an inventory constraint (e.g., a number of menu positions available within an in-game menu for displaying virtual objects), the virtual game's metadata (e.g., game classification information and marketing preferences), the player's game state (e.g., an amount of virtual currency attributed to the player's character), the player's consumer preferences (e.g., preference information indicating the player's preference to coffee over soda), and the like. Then, at operation 426, the method 420 may select at least one advertising offer to display to the player based on the opportunity constraints of the advertising opportunity. At operation 428, the method 420 may provide the client device with branded virtual objects from the selected advertising offers so that the client device 104 may display these branded virtual objects within the in-game menu.

At operation 430, the method 420 may determine whether the game networking system 108.2 received a player's selection for a different object category. If the player selects a different object category, the method 420 may return to operation 424 to generate a new advertising opportunity for the selected object category, and to provide the client device with a corresponding new set of branded virtual objects. It is to be appreciated that the methods described herein may be distributed over one or more game playing sessions.

If the player does not select a different object category, the method 420 may continue to operation 432 to determine whether the game networking system 108.2 received a player's selection for a branded virtual object.

If the method 420 determines at operation 432 that the player did not select a branded virtual object (e.g., the player selected an unbranded virtual object, or closed the in-game menu without selecting a virtual object), the method 420 may end without providing a branded virtual object to the player. However, if the method 420 determines at operation 432 that the player selected a branded virtual object (e.g., from display menu displaying one or more branded virtual objects), the method 420 may continue to operation 434 to facilitate placement of the branded virtual object by the player in the player's virtual environment.

Rebranding a Virtual Object

In some example embodiments, the player may select a placed virtual object of the player's virtual environment, and may indicate a desire to rebrand this virtual object. For example, the player may click on a "Tools" menu provided by a user interface of the virtual game, and may select a "Rebrand" tool that allows the player to select a virtual object to re-brand. Then, when the player selects a virtual object to re-brand, the player's client device (e.g., client device 302 of FIG. 3) may send an event notification 310 to the game server 304. This event notification 310 may indicate the virtual object that was selected by the player, and may indicate that the player desires to re-brand this virtual object. The virtual object to re-brand may be an un-branded virtual object, or may be a branded virtual object. In response to the re-branding event notification 310 from the client device 302, the game server 304 may perform an auction using method 420 to select branded virtual objects for the player, and the client device 302 may present the player with an in-game menu that displays these branded virtual objects for the user to select from.

Figure 4C:
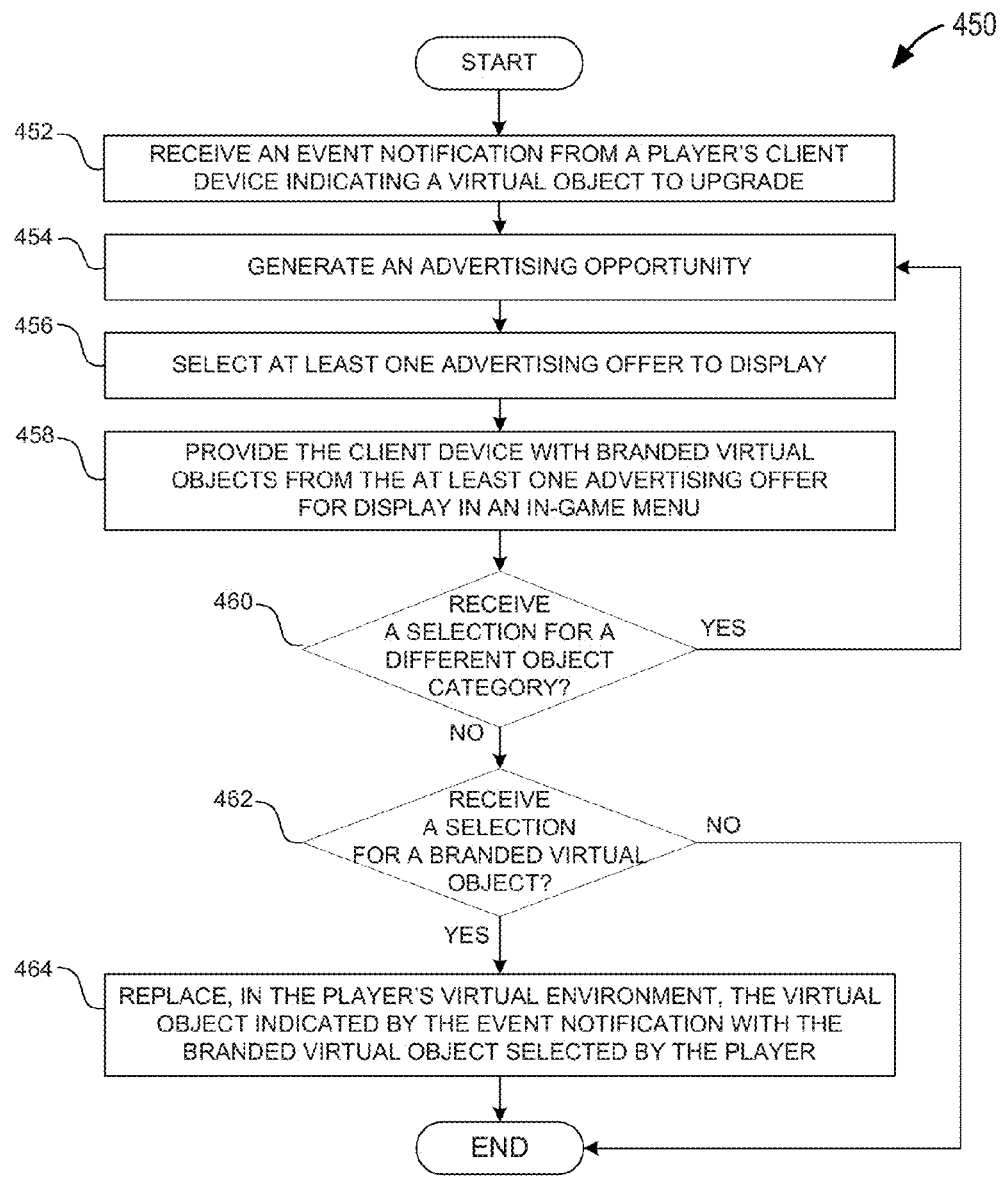
FIG. 4C shows a flowchart illustrating an example method for processing an advertising opportunity associated with a player's request to upgrade a virtual object in the virtual game, according to some embodiments.

FIG. 4C shows a flowchart illustrating an example method 450 for processing an advertising opportunity associated with a player's request to upgrade a virtual object in the virtual game. In an example embodiment, advertising opportunities are made and fulfilled on-the-fly while the game is in progress or being played. In some embodiments, the method 450 may be performed using the game networking system 108.2 and/or the ad bidding system 108.3, method 450 may perform communications 300, and, accordingly, is described by way of example with reference thereto. In some example embodiments, the method 450 performs an auction to fulfill an advertising opportunity for re-branding a virtual object placed within the player's virtual environment. The method 450 may select branded virtual objects to present to the player based on the category of the virtual object being re-branded, and may initially present the player with branded virtual objects that correspond to this object category. However, the player may select a branded virtual object of a different object category (e.g., by navigating an in-game menu that presents the selected branded virtual objects to the player).

The method 450 may begin at operation 452 by receiving the re-branding event notification 310. Then, at operation 454, the method 450 may generate an advertising opportunity for re-branding the virtual object selected by the player. For example, the method 450 may use the re-branding event notification 310 to generate an advertising opportunity for the object category corresponding to the selected virtual object. This advertising opportunity facilitates obtaining advertising offers for upgrading the selected virtual object, and may include at least an opportunity constraint that indicates the object category for the selected virtual object, and a number of menu positions that are available within an in-game menu for presenting a branded virtual object to the player. The advertising opportunity may also include an opportunity constraint that indicates the maximum dimensions for a branded virtual object (e.g., the dimensions of the virtual object to re-brand, or the dimensions of the unoccupied area of a virtual landscape that surrounds the virtual object).

At operation 456, the method 450 may select advertising offers to display to the player based on the opportunity constraints of the advertising opportunity. For example, the method 450 may generate a search query to obtain sorted search results of advertising offers, which may be sorted based on their proximity to the opportunity constraints of the advertising offer (e.g., sorted by how well their branded virtual objects fit at the placement position of the selected virtual object). The method 450 may then process the search query on a database that includes advertising offers from a plurality of advertisers to obtain the sorted search results, and may select a set of the top-ranking advertising offers from the sorted search results. Then, at operation 458, the method 450 may provide the client device with branded virtual objects from the selected advertising offers so that the client device 104 may display these branded virtual objects within the in-game menu.

In some example embodiments, the method 450 allows the player to upgrade the selected virtual object having a first object category to a branded virtual object of having a second, and different, object category. At operation 460, the method 450 may determine whether the game networking system 108.2 received a player's selection for a different object category. If the player selects a different object category, the method 450 may return to operation 454 to generate a new advertising opportunity for this object category, and to provide the client device with a corresponding new set of branded virtual objects. Once again, method 450 may generate an advertising opportunity with an opportunity constraint indicating the maximum dimensions for a branded virtual object that would fit at the placement position of the selected virtual object.

If the player does not select a different object category, the method 450 may continue to operation 462 to determine whether the game networking system 108.2 received a player's selection for a branded virtual object.

If the method 450 determines at operation 462 that the player did not select a branded virtual object (e.g., closed the in-game menu without selecting an upgraded virtual object), the method 450 may end without replacing the virtual object of the player's virtual environment. However, if the method 450 determines at operation 462 that the player selected a branded virtual object (e.g., from a display menu displaying one or more branded virtual objects), the method 450 may continue to operation 464 to replace the virtual object in the player's virtual environment with the branded virtual object that the player selected as an upgrade.

In some example embodiments, re-branding a virtual object incurs an upgrade cost (e.g., virtual currency) to the player. This upgrade cost may be determined by the method 450, or may be indicated by an advertiser. Also, in response to the player re-branding a virtual object to an advertiser's branded virtual object, the method 450 may charge the advertiser a re-branding bid amount that is different than a bid amount for placing a branded virtual object (e.g., the advertiser may indicate a separate bid for advertising opportunities associated with re-branding a virtual object, or the method 450 may calculate a higher or lower bid amount based on a determinable percentage of a bid amount for placing a branded virtual object).

In some example embodiments, the advertiser creates an upgraded version of a branded virtual object for the player to place in the player's virtual environment. For example, the advertiser may create a new advertising offer for the upgraded virtual object, and may create offer attributes for this offer that include the same object category and/or campaign name for the upgraded virtual object as that of the original branded virtual object. When the player selects the branded virtual object to re-brand, the method 450 may provide the player's client device with the upgraded version of the branded virtual object from this advertiser, along with other branded virtual objects from other advertisers. The player's client device may then present the player with an in-game menu that allows the player to replace the selected branded object with the upgraded virtual object of the same advertiser, or to select a branded virtual object from a different advertiser.

The upgraded virtual object may be a persistent upgrade, or may be a temporary upgrade (e.g., a Halloween-themed version of a virtual structure that is available during the month of October). In the case of a temporary upgrade, the advertiser may set a date range for the advertising offer's campaign. Then, when the campaign reaches the end date, the method 450 may replace the upgraded virtual object in the player's virtual environment with the original version of the branded virtual object. In some example embodiments, if the original version of the branded virtual object has also reached its end date, then method 450 may replace the branded virtual object with an un-branded virtual object.

Example Advertising Opportunities

In some example embodiments, an advertising opportunity may include an in-game display, or may include a branded product placement within the virtual game. Accordingly, the branded product may be provided in a GUI presented to a player participating in the virtual game. For example, an apparel company may submit a bid to display an image on a virtual billboard or poster displayed in a player's virtual environment of the virtual game. As a second example, a car manufacturer may submit a bid to cause a particular car model to drive through a virtual city of the virtual game. In various other embodiments, an advertising opportunity may include a menu position within an in-game menu for displaying a branded virtual object that a player can purchase and place within the player's personal virtual environment of the virtual game. In an example embodiment, the game networking system 108.2 provides a plurality (e.g., millions) of virtual environments each associated with a particular player. Individual players may uniquely build a virtual environment (e.g., a virtual city) using different virtual objects (e.g., virtual objects representing different physical objects such as buildings, cars, decorative signs, or the like). The virtual game may be an asynchronous multiplayer game that in which actions and/or events within the game progress even when a particular player is not playing the game. Thus, other players may visit the particular player's virtual environment and view the player's virtual environment, including the branded virtual objects even when the player is not actively playing the virtual game. In an example embodiment, the branded virtual objects are not pre-programmed into the virtual environment, but are added to the virtual game that is in progress by an advertiser or the game developer.

In some example embodiments, an advertising offer for presenting a branded virtual object in an in-game menu of the virtual game includes offer attributes that indicate skinning images for one or more orientations of the branded virtual object, an object category for the branded virtual object, item properties for the branded virtual object, and campaign information for the advertising offer. The item properties may include a cost for purchasing the branded virtual object, an earnings amount (e.g., a payout amount), a supply amount that indicates an amount of goods needed to re-supply the branded virtual object, and a display name for the branded virtual object. The campaign information may include a campaign name, a maximum bid amount, a campaign budget amount, a date range for the advertising campaign, and a game in which to execute the campaign.

In some example embodiments, a player may be presented with digital incentives associated with a branded virtual object. For example, players that have placed a branded virtual coffee shop within their virtual environment may be presented with a digital coupon redeemable against the price of a cup of coffee in a real-world (e.g., brick and mortar) coffee shop corresponding to the branded virtual coffee shop. An advertising offer for a digital incentive may include offer attributes that indicate a unique identifier for a physical good or service (e.g., a unique identifier for coffee sold virtually in a virtual coffee shop in the virtual environment), a coupon price for the physical good or service, a bid price for presenting the digital coupon to the player, and the like. In some embodiments, the offer attributes may indicate a market restriction for a set of venues and/or dates at which the digital coupon may not be redeemed (e.g., the coupon may not be redeemed at a downtown coffee shop on weekday mornings), a game state of the virtual game at which the digital coupon is to be presented to the player (e.g., when the player collects coins from the virtual coffee shop), and the like.

The offer attributes may also indicate a bid price for an incentive that is offered to the player to encourage the player to perform a particular in-game action (e.g., offering the player a free cup of coffee for inviting three other players to visit the virtual coffee shop). In various embodiments, an advertising offer may be associated with a group incentive, and the offer attributes may also indicate a social relationship required between players in the required number of players, a game state associated with a player in the required number of players, a minimum level of in-game social interaction from the required number of players, and/or the like. For example, these offer attributes may indicate that the incentive is to be provided to a group of at least two close friends that are highly active in the virtual game. The example social graph 200 (see FIG. 2) may be used to identify a relationship between two or more players.

In some example embodiments, method 420 (see FIG. 4B) may perform operation 426 to select a branded virtual object to include in the in-game menu by selecting an advertising offer for the advertising opportunity, such that the offer attributes of the advertising offer do not violate an opportunity constraint of the advertising opportunity. An opportunity constraint may include an inventory constraint of the advertising opportunity, and/or an entity constraint applicable to an entity from which the offer is received. An inventory constraint may, for example, include a number of available in-game displays (e.g., a virtual billboard or a poster of the virtual environment), a number of menu positions available within an in-game menu to display branded virtual objects, a number of pop-up views available to present offers to players of the virtual game, and/or the like. For example, the game system may include a limit to the number or frequency of pop-up displays that are presented to the player, and may determine an availability of pop-up displays based on the number of online players and the sum of their individual available inventories.

Figure 5:
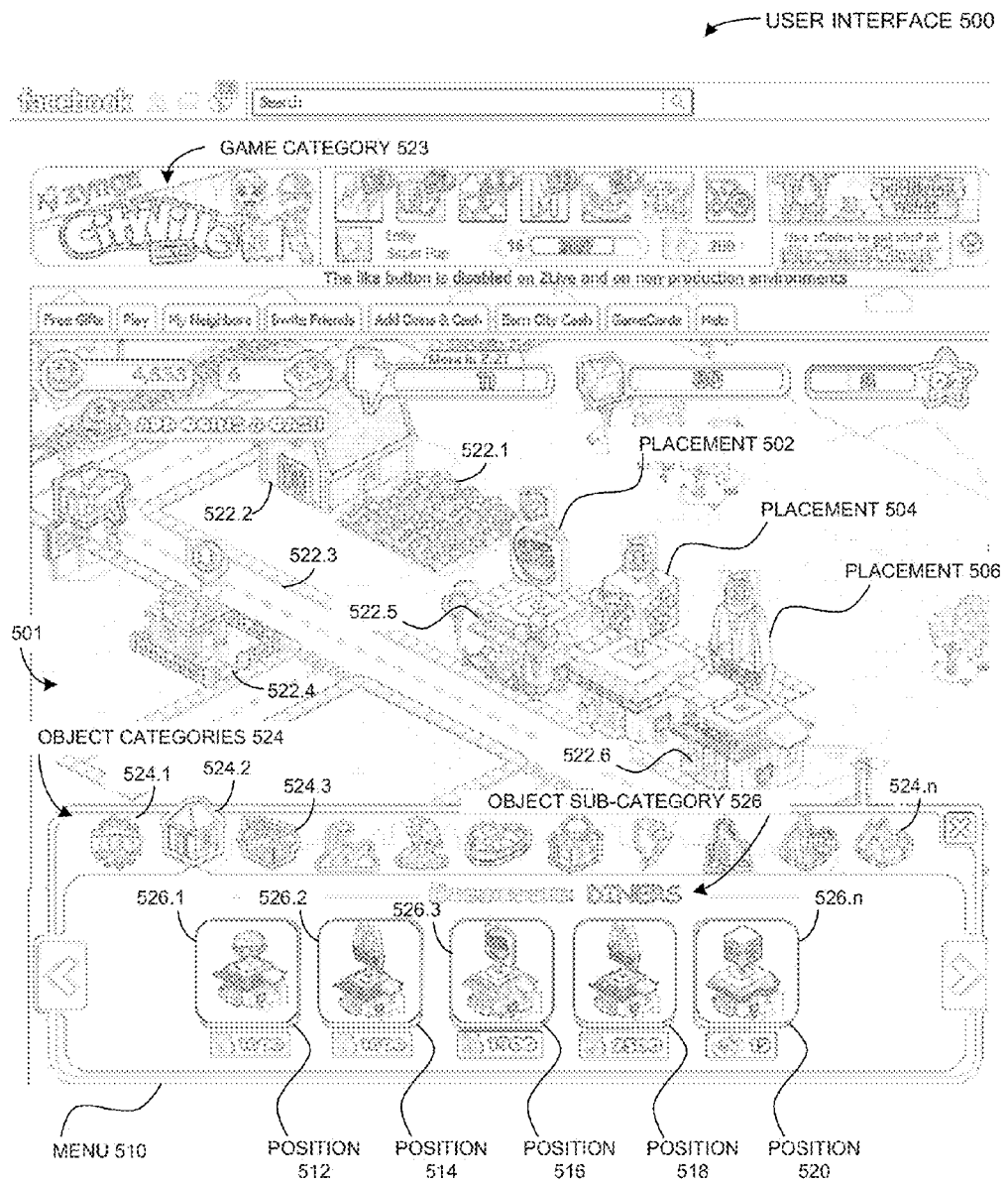
FIG. 5 shows an example user interface displaying a player's virtual environment on a display screen, according to some embodiments.

In some embodiments, an entity constraint may be imposed by the method 420 onto an entity (e.g., an advertiser) from which an offer is received. Example entity constraints include a visual constraint that restricts the placement and/or dimensions for images and virtual objects placed or located in the virtual environment, and may include a content constraint that restricts the nature of the content being displayed. For example, a visual constraint may include an available position on a virtual landscape within the virtual game that is displayed on a display screen of a client device 104, and may include a minimum and/or maximum dimensions for an in-game display or for a skinning image. A content constraint for a branded object being injected into the virtual game may include a virtual object category, a restriction to certain types of decorative objects, a list of restricted image content categories, a list of restricted words, a list of restricted brand names, a list of restricted products, and/or the like. Virtual object categories may include, for example, businesses (e.g., a diner, a restaurant, a store), a residential building (e.g., a hotel, a house), a public building (e.g., City Hall), a business asset (e.g., a stove), landmarks (e.g., the Eiffel tower), a decorative item (e.g., a tree, a fountain, roads), or the like.
Example Virtual Environment with Branded Virtual Objects FIG. 5 shows an example user interface 500 displaying a player's virtual environment 501 on a display screen. In some embodiments, the user interface 500 may be provided to the client device 104 by the game networking system 108.2, and displayed to the player by the client device 104. For example, the user interface 500 may provide the player with an example virtual game that includes a virtual city. In the example virtual game illustrated in FIG. 5, the user interface 500 shows the virtual city and various components or virtual structures of this city, and the player may interact with various components of this city (e.g., the player may collect coins from a branded virtual object 522.5 that shows a virtual structure representing a branded diner (e.g., a Burger King™ hamburger restaurant) to complete game objectives and earn virtual currency.

In various example embodiments, the player may click on (or otherwise activate) various aspects of the game interface to provide instructions to the virtual game. For example, by clicking on the branded virtual object 522.5, the player may collect virtual currency in the form of an in-game rent payment or in-game revenue. Moreover, the player's in-game character may possess a certain level of in-game character energy, and may expend a determinable amount of character energy when interacting with a virtual object to complete an in-game job (e.g., when plowing a field to grow a new crop). The player may also click on various icons in the user interface 500 to activate various game options. For example, the player may cause the virtual game to display an in-game menu (e.g., an in-game menu 510) that presents options for buying and selling in-game objects for use in the virtual environment. These in-game objects include but are not limited to virtual objects, virtual goods, virtual furniture, virtual appliances, décor, or the like.

In various example embodiments, the player may purchase virtual objects to construct a virtual city by placing these virtual objects within the virtual environment 501. For example, the player may place a farm plot object 522.1 in the virtual environment 501 to grow a crop, and may place a barn object 522.2 in the virtual environment 501 to store goods. The player may place a road 522.3 that spans across a portion of the virtual environment 501 for in-game characters to travel on, and may place a house 522.4 next to a portion of the road 522.3. The player may also place branded or unbranded businesses (e.g., a branded diner 522.5) next to the road 522.3, which allows the diner 522.5 to serve residents of the house 522.4. The player may collect rent from the house 522.4 at determinable time intervals, and may collect coins from the diner 522.5 after a determinable number of guests have been served.

In some example embodiments, placing additional houses in virtual environment 501 increases the population of the player's virtual city, which in turn may increase the rate at which a placed business serves guests, thereby increasing the rate at which the player may collect coins. Also, adding friends as neighbors (e.g., a friend 221 of the in-game social network 260 of FIG. 2) allows friends to send a tour bus to the player's virtual city, which may travel on road 522.3 to visit a placed business (e.g., the diner 522.5) in the player's virtual environment 501. The tour bus may then visit the branded virtual businesses in the virtual environment 501.

In some example embodiments, "placing" the virtual object is performed by the player selecting an object from the in-game menu 510 (e.g., the object 526.3 at menu position 516 of menu 510), at which point a game engine for the virtual game (e.g., an application executed by the client device 104 and/or the game networking system 108.2) places the selected object at an initial placement position of the virtual environment 501. The user may then drag the virtual object from the initial placement position to a desired placement position of the virtual environment 501 (e.g., a placement position 502). In other example embodiments, placing the virtual object is performed by the player dragging the virtual object from the menu 510 to the desired placement position (e.g., dragging object 526.3 from the menu position 516 to the placement position 502).

In some example embodiments, "selecting" the virtual object may be performed by the player using a pointing device (e.g., a mouse or a touch pad) to click on the virtual object (e.g., using the left mouse button). Moreover, "dragging" the object may be performed by the player using the pointing device to click on the virtual object, and drag the virtual object to a different display position while the mouse button is being held down. In other example embodiments, for a player using a touch screen (e.g., a resistive touch screen or a capacitive touch screen), "selecting" the virtual object may be performed by the player tapping (e.g., using a finger or a stylus) on a portion of the touch screen that is displaying the virtual object. Moreover, "dragging" the virtual object may be performed by the player placing a finger on a portion of the touch screen that displays the virtual object (e.g., the menu position 516), and dragging the finger across a portion of the touch screen that displays the virtual environment 501 to place the virtual object (e.g., the branded virtual object 522) at a different placement position (e.g., the placement position 502) of the virtual environment 501.

In various example embodiments, the menu 510 may include a set of menu positions that display unbranded or branded virtual objects of a certain object category. For example, the menu 510 may include a top display zone that displays multiple object categories 524 for the virtual game (e.g., for a game category 523). Moreover, when the player selects an object category (e.g., one of display categories 524.1-524.n), the system may present the player with a set of unbranded objects (not shown) from the selected category (e.g., virtual "diner" and "coffee shop" objects of a "business" category 524.2). In some example embodiments, this unbranded object represents an object sub-category 526 for which advertisers can submit advertising offers. If advertising offers exist for the object sub-category (e.g., sub-category 526), the player may click on the unbranded object in the menu 510 to view a set of virtual objects associated with this object sub-category (526.1-526.5). For example, menu 510 displays multiple virtual objects associated with the "diners" sub-category 526. Here, the position 512 of the "diners" sub-category 526 displays the unbranded "diner" virtual object 526.1, and the remaining menu positions (e.g., positions 514, 516, 518, and 520) may display branded virtual objects 526.2-526.n for which advertisers have bid.

In some example embodiments, at operation 424, the method 420 generates an advertising opportunity that accounts for the menu positions that are available for displaying branded virtual objects (e.g., menu positions 514, 516, 518, and 520), thereby making these menu positions available for bids from multiple advertising entities (e.g., the advertising system 108.n). For example, the method 420 may reserve a subset of the menu positions to display variations for the unbranded virtual object of an object sub-category (e.g., position 512 of the object sub-category 526), and may not account for these menu positions in the inventory constraint for an advertising opportunity.

In various embodiments, the menu position for a branded virtual object is determined based on a bid amount that an advertiser sets for the branded virtual object. For example, at operation 426, the method 420 may require higher bids for branded virtual objects that are placed farther away from an unbranded virtual object (e.g., the branded virtual goods are displayed in a sorted order of increasing bid amounts). Moreover, the cost (e.g., the amount of virtual currency needed for a player to buy a virtual object) may be higher for branded virtual objects that are placed farther from unbranded virtual objects, thereby resulting in a higher perceived value for these virtual objects. Thus, an advertising entity may find it beneficial to submit advertising offers with a highest possible bid amount so that their branded virtual objects, and thus their brand name, is attributed the highest perceived value within the virtual game.

In various other embodiments, the menu position for a branded virtual object is determined based on a cost that the advertiser sets for the branded virtual object (e.g., the branded virtual objects are sorted by an increasing or a decreasing cost), and an advertising opportunity may be generated for individual menu positions of the in-game menu 510. Thus, an advertising entity may need to increase the bid amount for an advertising offer associated with a menu position that is of high demand (e.g., for advertising offers that indicate a high cost or a low cost for a branded virtual object).

In some example embodiments, the branded virtual object may include an object that is customized by an advertising entity from which an offer is received. Also, the branded virtual object may include a virtual representation for a branded consumer product or service, such as a store or restaurant, clothing apparel, a food item, an automobile, etc. For example, a player may purchase a McDonald's™ diner to place within the virtual environment 501 of the virtual game, or may customize an avatar so that it wears distinguishable clothing that has been designed by Guess™ jeans.

Cross-Player Branded Virtual Object Interactions

In some example embodiments, the player may visit a friend's virtual environment (e.g., an in-game friend as reflected by the social graph 200 of FIG. 2, or any other player of the virtual game), either when the friend is online or offline. The player may view and interact with a branded virtual object that that player's friend placed in the player's friend's virtual environment. In some embodiments, the friend may place the branded virtual object in the friends' own virtual environment (e.g., virtual environment 501 of FIG. 5 may be a virtual environment for the player's friend) by selecting the branded virtual object from the in-game menu 510 of the user interface 500. The game networking system 108.2 may perform method 420 to select virtual objects to present to the friend using an in-game auction, and the game networking system 108.2 may place the branded virtual object at a position of the friend's virtual environment 501. In some embodiments, the branded virtual object is a persistent advertisement in the virtual environment 501 that is positioned by the friend, and that is presented to the player, the player's friend, and/or any player that visits the friend's virtual environment 501. If the player visits the friend's virtual environment 501 at a later game session, the player may interact with the branded virtual object once again if the friend has not removed this branded virtual object from the friend's virtual environment 501. This persistent advertisement allows the friend to share the friend's brand preferences with the player (and with any other visitor), which may have a higher influence on the player due to the player's repeated interactions with the branded virtual object across numerous visits, and due to the player knowing that this branded object was placed in the virtual environment by the player's friend (e.g., the player may treat the branded virtual object as a brand recommendation from the player's friend).

In some embodiments, the player's client device 104 may gather engagement details from the player's interactions with the branded virtual object, and may communicate these player engagements to the game networking system 108.2. The game networking system 108.2 may receive a request from an advertiser (the advertising system 108.n) for advertising analysis data, and the game networking system 108.2 may provide an advertiser (e.g., the advertising system 108.n) with this advertising analysis data that may includes the player engagements, demographic data obtained from a profile of the player (e.g., a profile of the player in the virtual game, a profile of the player in a social network), and other data that is derived from player engagements of a plurality of players.

Figure 6:
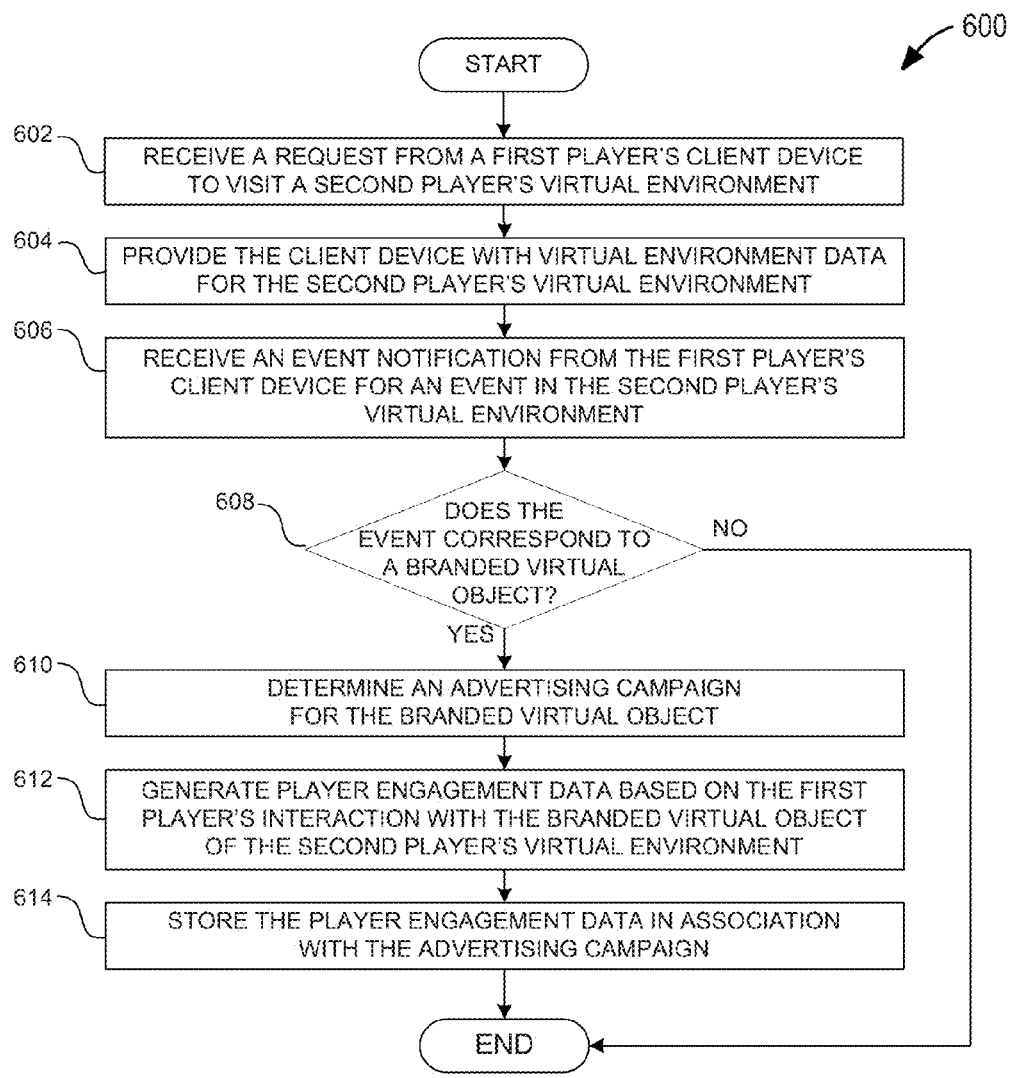
FIG. 6 shows a flowchart illustrating an example method for gathering engagement data from a player's interaction with a branded virtual object in a friend's virtual environment, according to some embodiments.

FIG. 6 shows a flowchart illustrating an example method 600 for gathering engagement data from a player's interaction with a branded virtual object in a friend's virtual environment. In an example embodiment, the player may visit the friend's virtual environment either when the friend is online or offline. In some embodiments, the method 600 may be performed using the game networking system 108.2 and may perform communications 300, and, accordingly, is described by way of example with reference thereto. Also, the virtual environment 501 of FIG. 5 may correspond to the player's friend, and method 600 is described by way of example with reference thereto.

The method 600 may begin at operation 602 by receiving a request from the player's client device (e.g., the client device 104 of FIG. 1) to visit the friend's virtual environment 501 (e.g., event notification 318 of FIG. 3). At operation 604, the method 600 may provide the client device with virtual environment data for the friend's virtual environment 501 (e.g., virtual environment data 320). Then, at operation 606, the method 600 may receive an event notification from the player's client device 104 for art event in the friend's virtual environment 501 (e.g., player engagements 322). Some events may involve the player interacting with a branded virtual object associated with an advertising campaign, while others may not. For example, the player may click on the crop object 522.1 to harvest the crop, or may click on a virtual object of a branded or unbranded business to collect coins or complete an in-game task.

At operation 608, the method 600 may determine whether the event corresponds to a branded virtual object that the player's friend placed in the virtual environment 501 (e.g., branded virtual object 522.6). If not (e.g., there is no advertising analysis data to gather from this event), the method 600 may end. Otherwise, if the method 600 determines at operation 608 that the event corresponds to a branded virtual object, the method 600 may continue to operation 610 to determine an advertising campaign for the branded virtual object. At operation 612, the method 600 may generate player engagement data based on the player's interaction with the branded virtual object of the player's friend's virtual environment 501. For example, the engagement data may include a record of the time duration (e.g., a date and/or time interval) at which the branded virtual object 522.6 was presented to the player at a prominent position of the user interface 500 (e.g., a time duration at which the branded virtual object 522.6 was viewable anywhere within the user interface 500, or was viewable within a determinable center portion of the user interface 500).

The engagement data, may also include a record of the interactions between the player and the branded virtual object 522.6. These interactions may include the player clicking on the branded virtual object 522.6 to send a tour bus to the branded virtual object 522.6 or to complete an in-game task (e.g., collect coins), and may include the user interface 500 presenting a branded message in a speech balloon over a character of the virtual environment 501. For example, the player may click on the branded virtual object 522.6 of the user interface 500 to send a tour bus to the branded virtual object 522.6, and a predetermined number of the player's characters will visit the branded virtual object 522.6. As the in-game characters leave the virtual object 522.6, the virtual environment 501 may display a speech balloon that includes a branded message from the advertiser (e.g., characters leaving the branded virtual object 522.6, e.g., a McDonalds virtual diner, may be displayed with a speech balloon that includes the slogan "I'm Loving It!").

Then, at operation 614, the method 600 may store the player engagement data in relation with the advertising campaign. In various example embodiments, the method 600 may store player engagement data for a plurality of players that engage with the branded virtual object (e.g., the interactions taking place either in the virtual environment 501 of the player's friend, or a virtual environment of any other player). Moreover, when the game networking system 108.2 receives a request for advertising analysis data (e.g., request 324 of FIG. 3), the game networking system 108.2 may generate the advertising analysis data 326 for the advertiser by aggregating player engagement data from the plurality of players that engage with the branded virtual object and may provide the advertising analysis data 326 to the advertiser. Examples for advertising analysis data 326 that may be provided to the advertiser is described in more detail below with respect to FIG. 12.

User Interface for Generating Advertising Offers

In various embodiments, an advertising entity may use a Web-based user interface to create an advertising offer for an object category. For example, the advertising entity may navigate through a hierarchy of object categories to select a desired object category, and may customize an unbranded virtual object of this desired object category to create a branded virtual object. The advertising entity may also use this Web-based UI to provide offer attributes for the advertising offer. These offer attributes may indicate a skinning image for one or more orientations of the branded virtual objects, and may include campaign information.

Figure 7A:
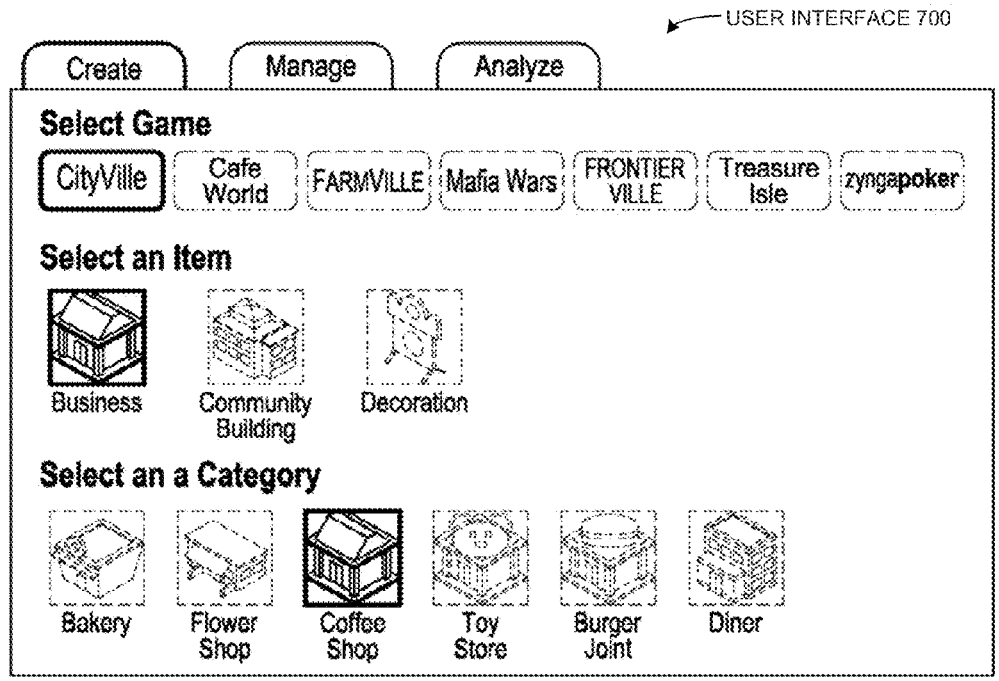
FIG. 7A shows an example user interface that allows an advertiser to select an object category for creating a branded virtual object for placement by a player in the virtual game, according to some embodiments.

FIG. 7A shows an example user interface 700 that allows an advertiser to select an object category for creating a branded virtual object for placement by a player in the virtual game. In some embodiments, user interface 700 may be provided to the client device 104 by the ad bidding system 108.3, and displayed to an advertiser by the client device 104. The user interface 700 may include a set of navigation tabs for accessing various features of an ad campaign utility. For example, the "create," "manage," and "analyze" tabs may provide the advertiser with features for creating, managing, and analyzing campaigns for branded virtual objects, respectively.

In some example embodiments, when the advertiser clicks on the "create" tab, the advertiser may be presented with an object category hierarchy that allows the advertiser to select an object sub-category for which to create an advertising offer. The advertiser may begin navigating the object category hierarchy by first selecting a game, and then selecting the appropriate object category and sub-category. The order in which the user interface 700 presents category items to an advertiser may or may not correspond to the order in which menu 510 (see FIG. 5) presents category items to a player. When the advertiser selects an object sub-category, the user interface 700 may present the advertiser with entry fields for creating a campaign for a branded virtual object (e.g., see user interface 750 of FIG. 7B).

Figure 7B:
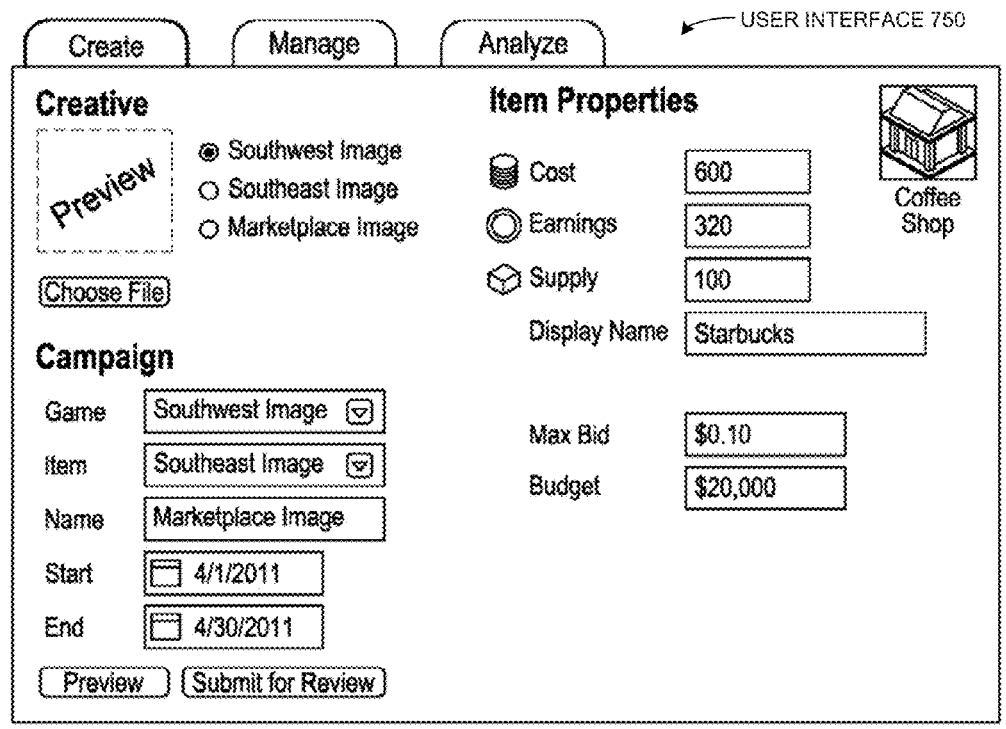
FIG. 7B shows an example user interface to create advertising offers that may be presented to the player for selection in the virtual game, according to some embodiments.

FIG. 7B shows an example user interface 750 to create advertising offers that may be presented to the player for selection in the virtual game. In some embodiments, user interface 750 may be provided to the client device 104 by the ad bidding system 108.3, and displayed to an advertiser by the client device 104. The user interface 750 may include an interface for uploading various images for the branded virtual object. For example, the advertiser may upload various images of the branded virtual object facing various directions (e.g., a southwest image and a southeast image), and may upload a thumbnail image to display in the in-game menu 510.

The user interface 750 may also include an interface for entering various properties for the branded virtual object. For example, the advertiser may provide a cost (e.g., an amount of virtual currency that a player pays to purchase the branded virtual object), an earnings amount (e.g., a revenue amount that a player earns periodically from the branded virtual object), and a supply amount (e.g., an amount of goods that a player needs to supply to the branded virtual object). The advertiser may also provide an in-game display name for the branded virtual object.

The user interface 750 may also include an interface for adjusting various campaign properties. For example, the advertiser may use a "Game" drop-down menu to select a different game category for the campaign, and may use an "Object" drop-down menu to select a different virtual object category for the campaign. The "Name" entry field allows the advertiser to provide a name for the campaign, the "Max Bid" entry field allows the advertiser to provide a maximum bid amount for the campaign, and the "Budget" entry field allows the advertiser to provide a budget for the campaign. The "Start" and "End" date fields allow the advertiser to enter a date range during which the campaign is to run.

Figure 8A:
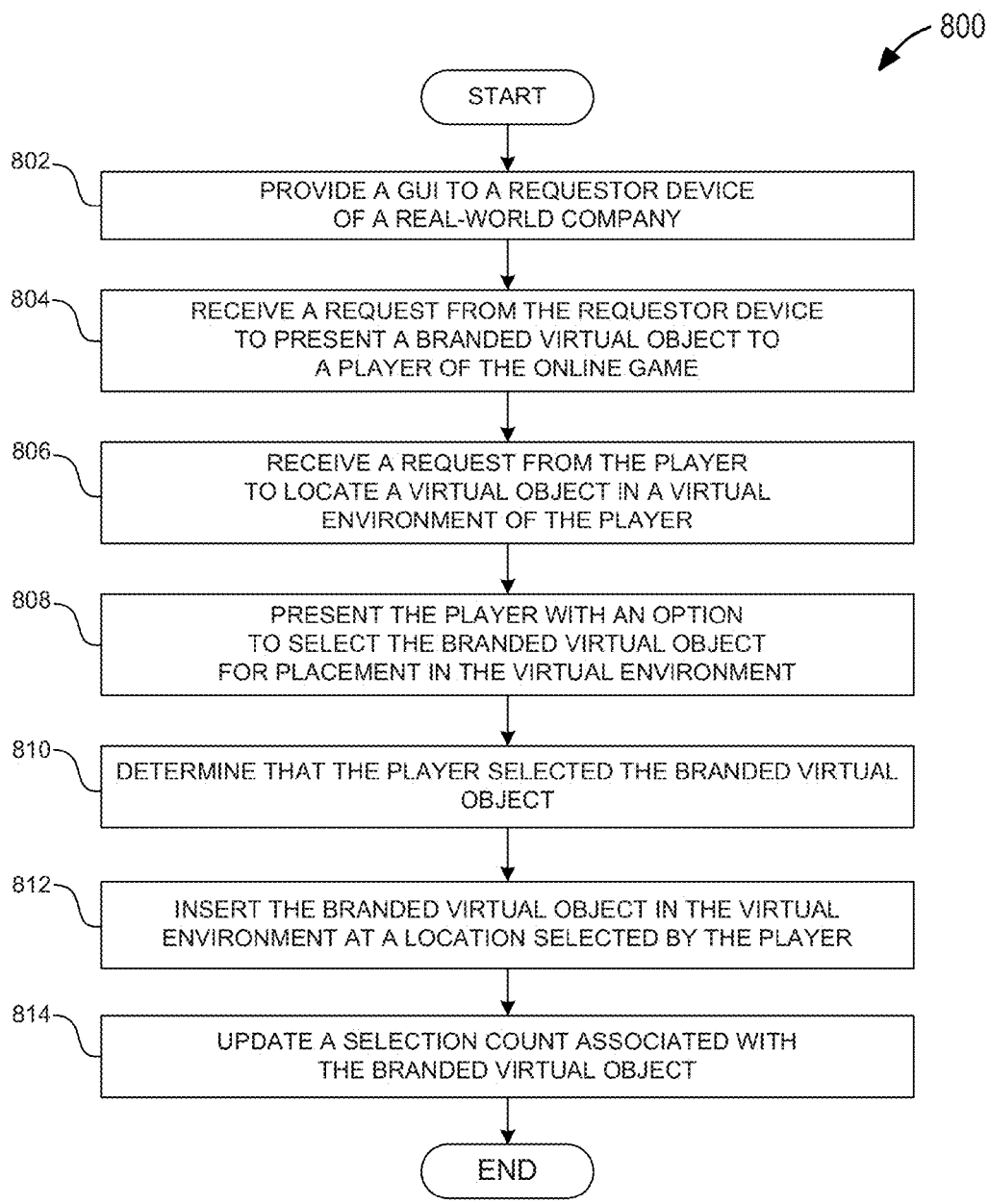
FIG. 8A shows a flowchart illustrating an example method for providing an interface to an advertiser that facilitates receiving a bid for an advertising opportunity, according to some embodiments.

FIG. 8A shows a flowchart illustrating an example method 800 for providing an interface to an advertiser that facilitates receiving a bid for an advertising opportunity. In some embodiments, method 800 may be performed using the ad bidding system 108.3 and, accordingly, is described by way of example with reference thereto. The method 800 may begin, at operation 802, by providing an advertiser's requestor device with a graphical user interface. The requestor device may be associated with a real-world company, for example, a brand or an advertising agency.

At operation 804, the method 800 may receive a request from the requestor device to present a branded virtual object to the player. For example, the requestor device may be associated with the McDonald's™ franchise, and the request received from the requestor device may include display information and advertising campaign information associated with the branded virtual object 526.2 of FIG. 5. In some example embodiments, the request from the requestor device may include placement parameters that indicate a presentation opportunity when the branded virtual object is to be presented to the player. The placement parameters, for example, may be selected from the group consisting of virtual geographic limitations, a player age limitation, a placement restriction within the virtual environment, and the like.

In some example embodiments, while the player is interacting with the virtual game (e.g., during rendering of the virtual game), the method 800 may update the player's virtual environment to include a branded virtual object selected by the player. At operation 806, the method 800 may receive a request from the player to locate a virtual object in the player's virtual environment. For example, the player may activate the menu 510 within the user interface 500 of FIG. 5, which may cause the player's client device 104 to send a request to the ad bidding system 108.3 to obtain at least one branded virtual object to display in the menu 510. Then, at operation 808, the method 800 may present the player with the menu 510 so that it includes the at least one branded virtual object. The menu 510 may include a plurality of menu positions that present the player with an option to select a branded virtual object or an unbranded virtual object for placement in the player's virtual environment. For example, the menu position 514 may present the player with the option to select the branded virtual object 526.2 that is associated with the McDonald's™ franchise.

At operation 810, the method 800 may determine that the branded virtual object was selected by the player from the menu 510. Then, at operation 812, the method 800 may insert the branded virtual object in the player's virtual environment at a placement position selected by the player. Further, at operation 814, the method 800 may update (e.g., increment) a selection count associated with the selected branded virtual object. For example, the player may select the branded virtual object at the menu position 516 of the in-game menu 510, and may place the branded virtual object at the placement position 502 of the player's virtual environment 501. Then, the method 800 may insert the branded virtual object 522.5 at the placement position 502 of the virtual environment 501.

In some example embodiments, the method 800 receives a plurality of requests from a plurality of requestor devices, where each request may include a bid for an advertising opportunity to present a branded virtual object in the virtual game. Further, a request may indicate an object category for which the bid is placed. Thus, at operation 808, the method 800 may present the player with an option to select, for a certain object category, the branded virtual object of the requestor device from which the highest bid is received. For example, the in-game menu 510 of FIG. 5 may include a plurality of menu positions that display virtual diners, and the menu position 516 may present the branded virtual object 526.3 to the player based on determining that the request from the Burger King™ franchise is the highest bid. Further, the in-game menu 510 may present a plurality of branded virtual objects that may correspond to different real-world brands. In some example embodiments, at least two virtual objects presented in the menu 510 correspond to virtual structures that correspond to vendors of similar goods or services.

Figure 8B:
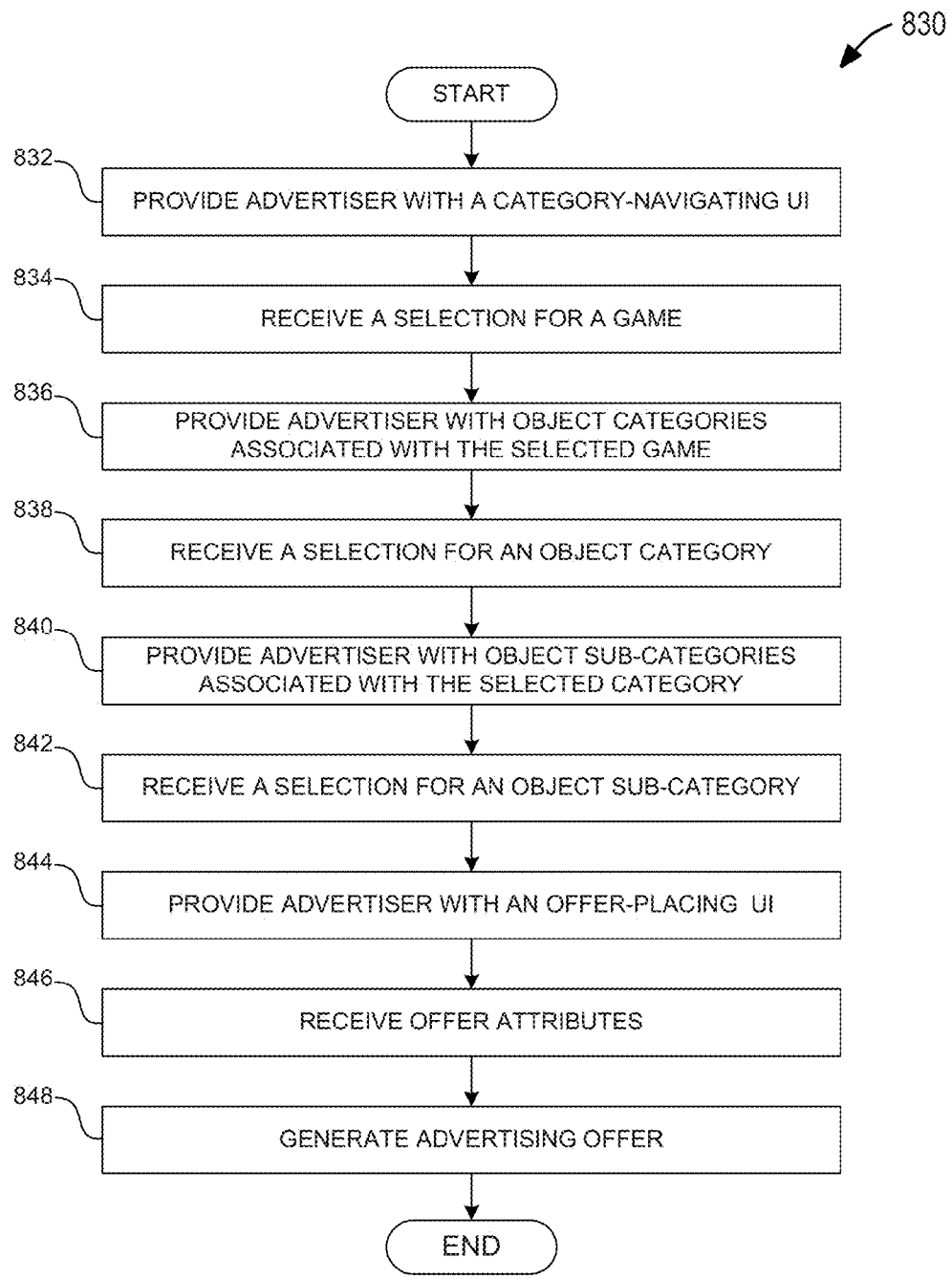
FIG. 8B shows a flowchart illustrating an example method for creating an advertising offer for the virtual game, according to some embodiments.

FIG. 8B shows a flowchart illustrating an example method 830 for creating an advertising offer for the virtual game. In some embodiments, method 830 may be performed using the ad bidding system 108.3 and, accordingly, is described by way of example with reference thereto. Further, the method 830 may correspond to operation 804 of FIG. 8A.

The method 830 may begin, at operation 832, by providing an advertiser with a category-navigating user interface (e.g., user interface 700 of FIG. 7A). The method 830 may then receive a selection for a game (e.g., CityVille) from the advertiser at operation 834, and may provide the advertiser with object categories for the selected game at operation 836. At operation 838, the method may receive a selection for an object category (e.g., "Businesses") from the advertiser, and at operation 840, the method 830 may provide the advertiser with object sub-categories for the selected object category. Then, at operation 842, the method 830 may receive a selection for an object sub-category (e.g., a diner) for which to generate an advertising offer. In various example embodiments, at operations 834, 838, and 842, the method 830 may update the user interface 700 to dim the items not selected by the advertiser (e.g., to dim the "Community Building" category when the advertiser selects the "Businesses" category).

At operation 844, the method 830 may provide the advertiser with an offer-placing user interface (e.g., user interface 750 of FIG. 7B), which the advertiser may use to create a branded virtual object, and to enter offer attributes and other campaign information related to an advertising offer for the branded virtual object.

In some example embodiments, an advertiser provides a higher bid amount for the branded virtual object to have a higher payout amount (e.g., to pay more coins to the player when the player clicks on the branded virtual object to collect coins). For example, the menu 510 of FIG. 5 may display virtual objects that are sorted by their payout amount, and the ad bidding system 108.3 may select virtual objects to display in the menu 510 of FIG. 5 in an order that is sorted by their payout amount (e.g., at operation 424 of the method 420), but may not include branded virtual objects whose advertising offer indicates a bid amount that is below a determinable value (e.g., as determined based on the payout amount).

In various example embodiments, at operation 844, the method 830 interacts with the advertiser to facilitate receiving advertising offers that are likely to be selected for display in the in-game menu 510. For example, the method 830 may determine a minimum bid value for an advertising offer based on one or more of the offer attributes (e.g., based on the value in the "Earnings" entry field of FIG. 7B). If the advertiser includes a bid that is below the determined minimum value, the method 830 may inform the advertiser that the bid amount is too low (e.g., by presenting a message to the advertiser via a pop-up display, or by providing the message in red next to the "Earnings" entry field of FIG. 7B. In some embodiments, the advertising offer needs to include a bid amount that is at or above the determinable minimum value before it can be accepted, in which case the method 830 may update the user interface 750 at operation 844 to replace the value in the "Max Bid" entry field of FIG. 7B with the determinable minimum value, or the method 830 may dim the "Submit for Review" button until the advertiser has entered a value in the "Max Bid" that is above the determinable minimum value (or until the advertiser has entered a value in the "Earnings" entry field that causes the method 830 to compute a new determinable minimum value that is at or below the advertiser's "Max Bid" value).

At operation 846, the method 830 may then receive offer attributes from the advertiser at operation 846, for example, when the advertiser clicks on the "Submit for Review" button of the user interface 750 (e.g., offer attributes associated with the entry fields provided by user interface 750 of FIG. 7B). Then, at operation 848, the method 830 may generate an advertising offer based on these offer attributes.

Figure 9:
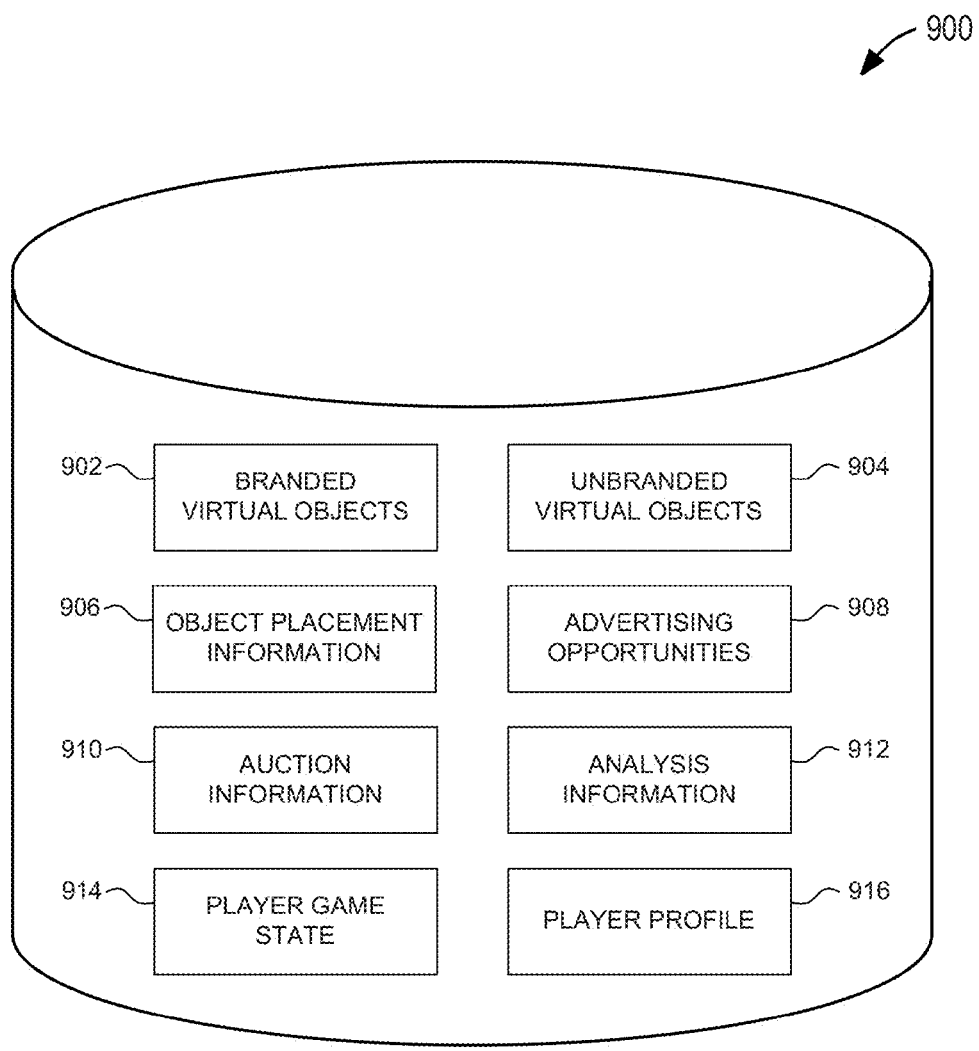
FIG. 9 shows an example database to store auction and placement information related to virtual objects, according to some embodiments.

FIG. 9 shows an example database 900 to store auction and placement information related to virtual objects. In some embodiments, the database 900 is managed by the game networking system 108.2 and/or the ad bidding system 108.3 and, accordingly, is described by way of example with reference thereto. For example, the database 900 may include a structured query language (SQL) database that is managed using a SQL-based database management software (e.g., MySQL, SQLite, or the like), or may include other database technologies now known or later developed (e.g., a proprietary data structure that is managed using proprietary database management software).

The database 900 may include database tables for storing implementation details for branded virtual objects 902 and unbranded virtual objects 904, and for storing object placement information 906 for branded virtual objects 902 and unbranded virtual objects 904. In some embodiments, an advertiser may access the example user interfaces 700 and 750 to create a branded virtual object 902, and to create an advertising campaign related thereto. In response, the ad bidding system 108.3 may create a corresponding entry in the database table for branded virtual object 902 to store implementation details for the branded virtual object 902 and the advertising campaign information related thereto (e.g., advertising offers). Moreover, throughout the evolution of the virtual game, a developer for the virtual game may create new entries in the database table for unbranded virtual objects 904 to store new virtual objects for players to interact with, or may update existing entries to upgrade the functionality and/or visual representation for an existing virtual object.

In some example embodiments, as players purchase and place either branded virtual objects 902 or unbranded virtual objects 904 in their virtual environment, the game networking system 108.2 updates database table entries for the object placement information 906 to reflect these object placements. Also, if a player moves a virtual object to a different placement position of the player's virtual environment, the game networking system 108.2 may update the corresponding entry of the object placement information 906 to reflect this new placement position. Further, the database 900 may include a selection count, a view count, and an engagement count for branded virtual objects 902 and unbranded virtual objects 904.

The database 900 may also include database tables for storing advertising opportunities 908, and for storing auction information 910 related thereto. For example, the ad bidding system 108.3 may store an advertising opportunity for displaying a billboard advertisement within the player's virtual environment. Also, as multiple players access the example menu 510 of FIG. 5 to view branded virtual objects 902 of a particular sub-category, the ad bidding system 108.3 may create database table entries for advertising opportunities 908 to reflect these new menu advertising opportunities for these players. The ad bidding system 108.3 may update (either in real-time, or periodically) an inventory amount for these advertising opportunities 908 across the multiple players. The ad bidding system 108.3 may use the inventory amount for this particular sub-category to determine a minimum bid price for this advertising opportunity. In various example embodiments, the ad bidding system 108.3 may update the database table entries for the advertising opportunities 908 to reflect the winning bids, and may update the database table entries for the auction information 910 to store charge amounts for the advertisers that won the bids.

The database 900 may also include database tables for storing analysis information 912 related to player interactions with the branded virtual objects 902 and the unbranded virtual objects 904. For example, the game networking system 108.2 and/or the ad bidding system 108.3 may track how the player interacts with a particular virtual object in the player's virtual environment, and may generate analysis data. The analysis data may include at least one of a unique identifier for the particular virtual object, unique identifiers for other virtual objects placed within a determinable distance of the particular virtual object in the virtual environment, an interaction frequency (e.g., collecting coins from a coffee shop) for the particular virtual object and/or any other context information associated with branded virtual objects 902 or unbranded virtual objects 904.

The database 900 may also include database tables for storing a player game state 914 that may include information about the player's virtual environment, the player's character, or other game-related information. For example, player game state 914 may include virtual objects owned or used by the player, placement positions for virtual structural objects in the player's virtual environment, and the like. Player game state 914 may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database 900 may also include database tables for storing a player profile 916 that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile 916 may also include derived player information that may be determined from other information stored in the database 900. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile 916. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile 916. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may purchase a certain branded virtual object from the virtual game, or may complete a new challenge within a determinable period of time from when it is first presented to him.

In some example embodiments, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment. For example, the game networking system 108.2 may determine the player's likelihood to lead value based on measurements for a number of friends that purchase a certain branded virtual object after they interact with this branded virtual object within the player's virtual environment.

Storing Branded Virtual Objects

In some example embodiments, the database 900 may store description information and placement positions for a plurality of branded virtual objects (e.g., individual instances of the branded virtual object across a plurality of virtual environments for a plurality of players). The game networking system 108.2 may receive advertising offers from a plurality of advertisers, and may store these advertising offers in the database 900. For example, an advertiser may use the user interface 750 to create an advertising offer that includes description information for a branded virtual object (e.g., display images, a cost amount, an earnings amount, and a supply amount for the virtual object), various campaign parameters (e.g., a campaign name, a bid amount, and/or the like). Also, the advertiser may associate an advertising campaign with one or more advertising offers (e.g., the advertiser may assign the same campaign name to multiple advertising offers). When the advertising offer wins an auction and the player places the branded virtual object within the player's virtual environment, the game networking system 108.2 may store placement information for the branded virtual object in the database 900 in relation to the advertising offer for the branded virtual object.

Figure 10:
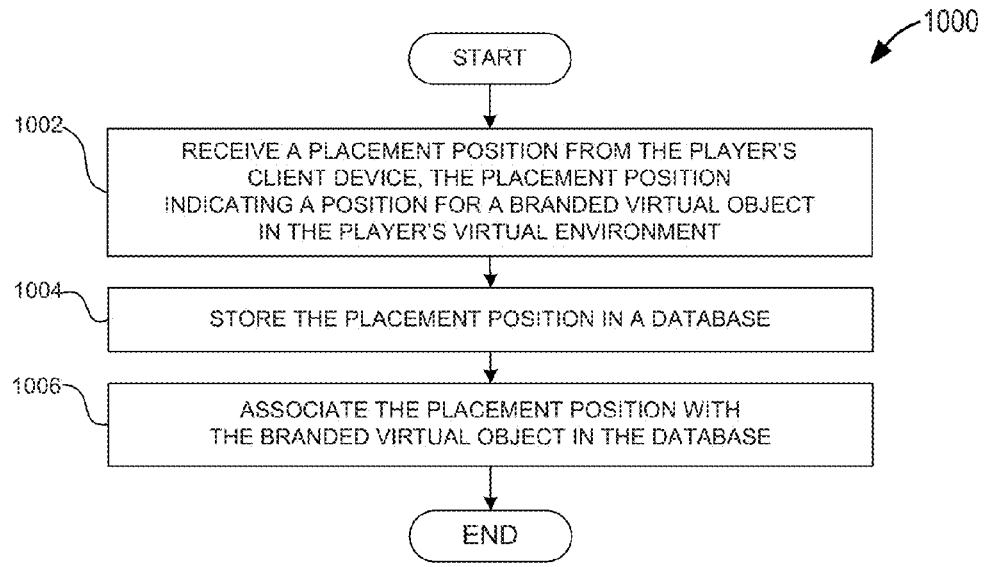
FIG. 10 shows a flowchart illustrating an example method or storing a placement position for a branded virtual object in a database, according to some embodiments.

FIG. 10 shows a flowchart illustrating an example method 1000 for storing a placement position for a branded virtual object in a database. In some embodiments, the method 1000 may be performed using the game networking system 108.2 and, accordingly, is described by way of example with reference thereto. In some embodiments, the method 1000 may perform operation 434 of FIG. 4 to place a branded virtual object in the player's virtual environment. The method 1000 may begin, at operation 1002, by receiving a placement position from the player's client device. The placement position may indicate a position of the player's virtual environment for the branded virtual object. For example, the player may use the user interface 500 (see FIG. 5) to select the branded virtual object at menu position 516 from the in-game menu 510, and to place the branded virtual object 522.5 at a placement position 502 in the player's virtual environment 501.

At operation 1004, the method 1000 may store the placement position 502 in the database 900. Then, at operation 1006, the method 1000 may associate the placement position with the branded virtual object in the database 900. For example, the method 1000 may store a relation between the placement position 502 and the branded virtual object 522.5 (or to its advertising offer) in the database 900. This stored relation between the placement information in the player's virtual environment and the branded virtual object facilitates presenting the branded virtual object at a persistent position of the player's virtual environment across multiple game sessions. In some embodiments, the branded virtual object is a persistent advertisement that is selected by the player, and that is positioned at the placement position of the player's virtual environment that is selected by the player. For example, as the player (or a visiting player) views the virtual environment during subsequent game sessions, the virtual game may present the branded virtual environment at the same placement position of the virtual environment until either the player moves the branded virtual object to a different placement position of the virtual environment, or the player removes the branded virtual object from the virtual environment.

Accessing Branded Virtual Objects

In various example embodiments, the game networking system 108.2 may perform a search through the database 900 using a search query to select one or more branded virtual objects to present to the player. For example, the search query may be a SQL search query that is either generated by the game networking system 108.2, or received from client device 104 or the advertising system 108.3.

In some example embodiments, when providing virtual environment data, to the player's client device (e.g., at operation 604 of FIG. 6), the game networking system 108.2 may generate a search query to determine virtual objects that the player has placed in the player's virtual environment. For example, method 1000 may store a placement position for a branded virtual object (e.g., a persistent advertisement). Then, when the player (or a visiting player) visits the player's virtual environment, the game networking system 108.2 may generate a search query based on various placement positions of the player's virtual environment. For a certain placement position, the search results will include the branded virtual object (e.g., the persistent advertisement) that was previously placed in the virtual environment by the player.

In some example embodiments, the game networking system 108.2 may generate a search query to select branded virtual objects to present to the player in the in-game menu 510 (see FIG. 5). The search query may be used to select advertising offers based on an object category, and to generate search results that include advertising offers sorted based on their offer attributes.

Figure 11:
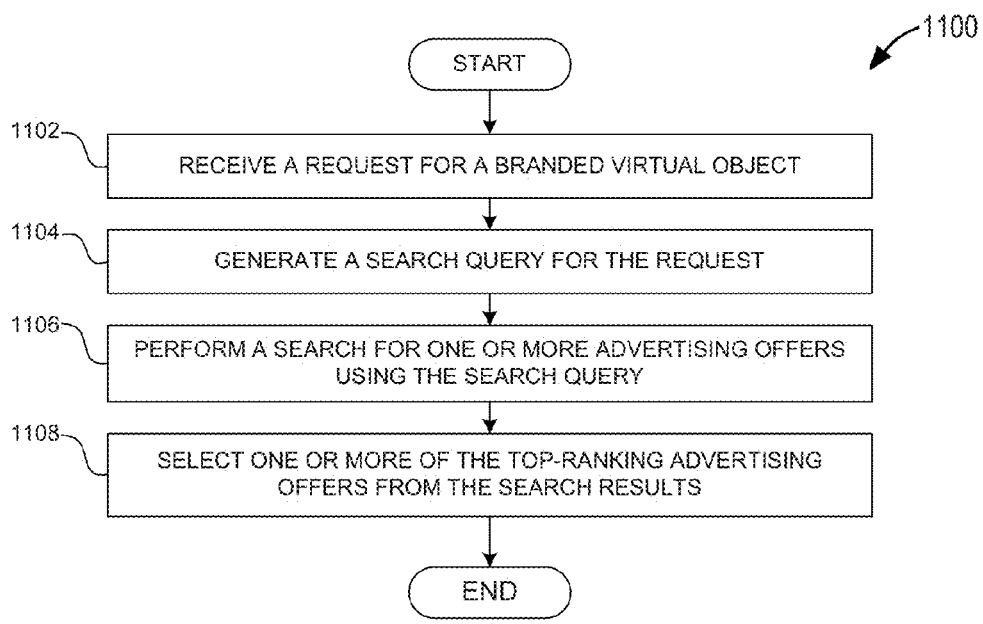
FIG. 11 shows a flowchart illustrating an example method for using a search query to select advertising offers to present to the player, according to some embodiments.

FIG. 11 shows a flowchart illustrating an example method 1100 for using a search query to select advertising offers to present to the player. In some embodiments, the method 1100 may be performed using the game networking system 108.2 and, accordingly, is described by way of example with reference thereto. In some embodiments, the method 1100 may perform operation 426 of FIG. 4B or operation 456 of FIG. 4C to select advertising offers to display to the player. The method 1100 may begin, at operation 1102, by receiving a request for advertising offers. For example, the player may select an object category of the in-game menu 510 of the user interface 500 (see FIG. 5), and the player's client device 302

(see FIG. 3) may send the event notification 310 to the game server 304 that may include a request for advertising offers associated with the selected object category. As another example, the player may select a virtual object in the player's virtual environment to re-brand, and the player's client device 302 may send the event notification 310 to the game server 304 that may include the request for advertising offers associated with an object category of the virtual object being re-branded.

Then, at operation 1104, the method 1100 may generate a search query for the request, and at operation 1106, the method 1100 may perform a search for one or more advertising offers using the search query. For example, if the player desires to select a virtual diner to place in the player's virtual environment, the method 1100 may generate the search query to select advertising offers for the "diner" object category from the database 900 (e.g., from the branded virtual objects 902). Then, the method 1100 may use the search query to perform a search through the database 900 and generate search results that include advertising offers that satisfy the search query parameters.

In some example embodiments, the method 1100 generates a search query at operation 1104 based on the object category selected by the player from the in-game menu 510. In other example embodiments, the method 1100 may generate a search query at operation 1104 based on the object category for a virtual object that the player desires to re-brand. The search query may, for example, select branded virtual objects that correspond to this object category, and that satisfy various opportunity constraints imposed by the advertising opportunity. For example, the opportunity constraints may indicate player attributes (e.g., location information and/or the player's game state information), game attributes (e.g., a game theme of the virtual game), and/or the like. Moreover, if the advertising opportunity corresponds to the player selecting a branded virtual object to re-brand, the opportunity constraints may also include the maximum dimensions for a branded virtual object that may replace the virtual object at the placement position of the virtual environment. The maximum dimensions may correspond to the dimensions of the virtual object being replaced, or may correspond to the dimensions of the unused area in the virtual environment that surrounds the virtual object being replaced (e.g., an unused virtual landscape surrounding the virtual object).

In various example embodiments, the game networking system 108.2 generates the search query to obtain advertising offers that are sorted based on their offer attributes. For example, the search query may cause the search results to be sorted based on a build-through rate for the branded virtual objects (e.g., the advertising offers may be sorted by computing the product of each advertising offer's build-through rate and its bid amount). The build-through rate indicates a percentage of players that place an advertiser's branded virtual object in their virtual environment after being presented with the branded virtual object within the in-game menu 510 (see FIG. 5). As another example, the search query may cause the search results to be sorted based on a level of player engagements with the branded virtual objects. The level of player engagements may include the number of times players view the branded virtual object in a virtual landscape, and the number of times the players click on the branded virtual object (e.g., to collect coins, to supply the branded virtual object, to send a tour bus to the branded virtual object, and/or the like).

In some example embodiments, the search query causes the search results to be sorted by an increasing cost to the player, and/or by an increasing payout amount to the player.

The branded virtual objects may be presented to the player in this sorted order, which may convey to the player that the perceived value for the branded objects also increases in this order. In some example embodiments, the advertising offers may be sorted based on how well they match the player game state 914 and/or the player profile 916 (see FIG. 9). Moreover, the method 1100 may compute a weighted value for individual advertising offers in the search results (e.g., based on an expression in the search query), and may sort the search results based on the weighted values. For example, some advertising offers may be associated with a physical location (e.g., the physical location for a brick-and-mortar business associated with the advertising offer), and the method 1100 may assign a higher weighted value for advertising offers associated with a physical location that are relatively close to the player's physical location (e.g., the player is frequently within the same city or a near-by city, or the player frequently visits the brick-and-mortar business).

The method 1100 may also compute a purchase likelihood value for individual advertising offers in the search results (e.g., a likelihood that the player may purchase the corresponding branded virtual object), and may assign weighted values to the advertising offers in the search results based on their purchase likelihood values. The purchase likelihood value may, for example, be computed based on the advertising offer's similarity or relevance to virtual objects in the player's purchase history, virtual objects in the player currently owns, virtual objects in the player's wish list, virtual objects which the player needs to complete an unfinished challenge, and/or the like. The purchase likelihood value may also be computed based on classification data for the advertising offer, and its resemblance to the player's pattern of game-play, the player's temperament during game play, and/or any other data from the player profile 916.

Then, at operation 1108, the method 1100 may select one or more of the top-ranking advertising offers from the search results. In some embodiments, the method 1100 may screen the search results using additional opportunity constraints to ignore advertising offers that violate an opportunity constraint. For example, the method 1100 may ignore an advertising offer if it includes a restricted word (e.g., uses profanity), includes a restricted image, corresponds to a restricted brand, corresponds to a restricted product (e.g., cigarettes), or includes other restricted content.

Providing Advertising Analysis Data

In some example embodiments, the game networking system 108.2 tracks how players engage with branded virtual objects placed in a plurality of virtual environments of the virtual game, and may store these engagements within the analysis information 912 of the database 900. These engagements may include the interactions that a player performs with a branded virtual object to build the branded virtual object at a certain position of the virtual game, and may include the interactions that the player (or any visiting player) may perform while interacting with the branded virtual object that the player has placed in the player's virtual environment. In some example embodiments, the game networking system 108.2 receives a request from an advertiser (e.g., the advertising system 108.n) to obtain advertising analysis data, and the game networking system 108.2 may generate this advertising analysis data based on player engagement data stored in the database 900.

Figure 12:
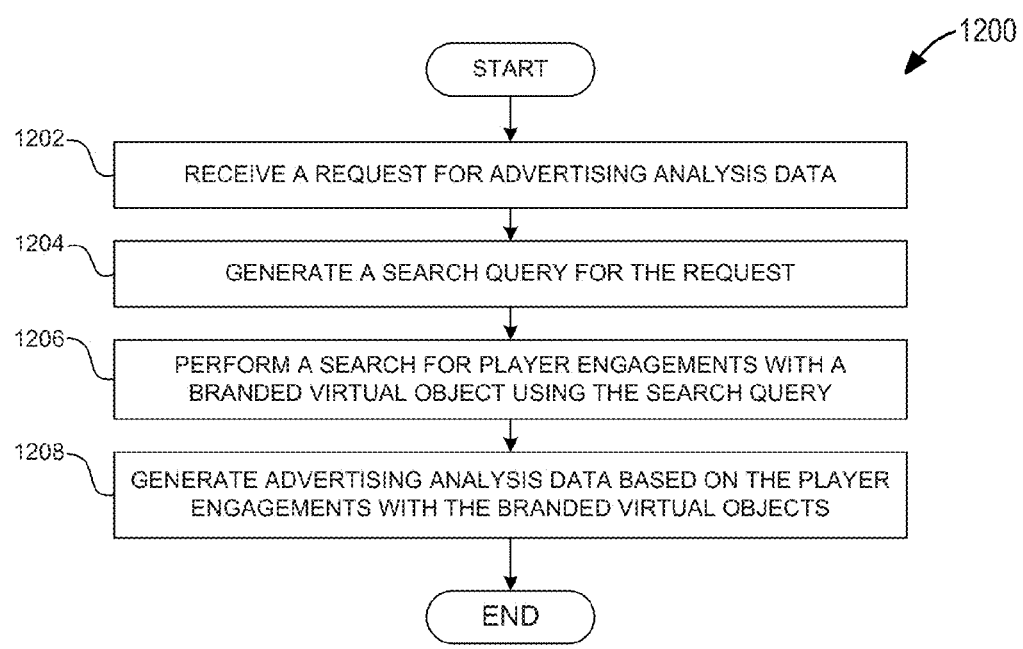
FIG. 12 shows a flowchart illustrating an example method for generating advertising analysis data for an advertiser, according to some embodiments.

FIG. 12 shows a flowchart illustrating an example method 1200 for generating advertising analysis data for an advertiser. In some embodiments, the method 1200 may be performed using the game networking system 108.2 and, accordingly, is described by way of example with reference thereto.

The method 1200 may begin, at operation 1202, by receiving a request from an advertiser for advertising analysis data. Then, at operation 1204, the method 1200 may generate a search query for the request. For example, the method 1200 may receive a request from the advertiser for advertising analysis data pertaining to a certain advertising campaign that may include one or more branded virtual objects. The method 1200 may then generate a search query for the request, which may search the database 900 for player engagements that one or more players have performed with the branded virtual objects of the advertiser's campaign. At operation 1206, the method 1200 may use the search query to perform a search in database 900 for player engagements with the advertiser's branded virtual objects. Then, at operation 1208, the method 1200 may generate advertising analysis data based on the player engagements with the branded virtual objects of the advertiser's campaign.

In some embodiments, at operation 1208, the method 1200 computes a build-through rate for a branded virtual object which indicates a percentage of players that place an advertiser's branded virtual object in their virtual environment after being presented with the branded virtual object within the in-game menu 510 (see FIG. 5). For example, the game networking system 108.2 may use the database 900 to store a record for the instances at which the advertiser wins a bid to display a branded virtual object in the in-game menu 510 (e.g., the date, the player to which the branded virtual object was presented, and the like). The game networking system 108.2 may also use the database 900 to store a record for the instances at which the branded virtual object is placed in a virtual environment (e.g., the date, the player that placed the branded virtual object, and the like). Then, at operations 1204 and 1206, the method 1200 may generate and process a search query to determine the number of impressions in the in-game menu 510 for the branded virtual object during a certain time period (e.g., per hour, per day, per month, per year, and the like), and the number of times the branded virtual objects have been placed in a virtual environment during this time period. Then, at operation 1208, the method 1200 may determine the build-through rate for the branded virtual object for this time period by computing the ratio of the number of impressions to the number of times the branded virtual object has been placed in a virtual environment within this time period.

In some example embodiments, the game networking system 108.2 stores a tally of the number of impressions for the branded virtual object within a determinable time period, and may store a tally of the number of times the branded virtual object has been placed (e.g., built into a virtual structure) in a virtual environment within this time period. The game networking system 108.3 may store this tally information in the analysis information 912 of the database 900, and may do so for various time periods (e.g., per hour, per day, per month, per year, and the like). Then, the method 1200 may use this tally information at operation 1208 to compute the build-through rate for the branded virtual object.

In some example embodiments, the method 1200 generates advertising analysis data that indicates whether the player has placed the advertiser's branded virtual object at a prominent position of the virtual environment. For example, the method 1200 may generate and process a search query to determine a placement position of the branded virtual object, and may determine position coordinates for a perimeter of a determinable size that surrounds the virtual object. Then, the method 1200 may generate and process a second database search query to determine the value (e.g., the cost, or an esteemed value) of other virtual objects placed within this perimeter's coordinates. If the determined value is above a determinable amount, the method 1200 may determine that the branded virtual object may be highly regarded by the player.

As another example, the method 1200 generates and processes one or more search queries to determine other virtual objects that are positioned in front of the advertiser's branded virtual object. Then, based on the placement position and size of these other virtual objects, the method 1200 may determine whether the image for any of these virtual objects is tall enough to cover at least a portion of the advertiser's branded virtual object. For example, the method 1200 may determine a percentage of the virtual object's image that is being covered by other virtual objects. If the percentage is above a determinable amount, the method 1200 may determine that the virtual object is not highly regarded by the player.

In some example embodiments, the method 1200 determines a value indicating how much this player likes the advertiser's brand based on determining whether the player has placed the advertiser's branded virtual object at a prominent position of the player's virtual environment. In other embodiments, the method 1200 may determine a value indicating how much players like the advertiser's brand based on determining a percentage of players that have placed the branded virtual object at a prominent position of their virtual environment.

Example Game Systems, Social Networks, and Social Graphs

In an online multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in an online multiplayer game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network is formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 13:
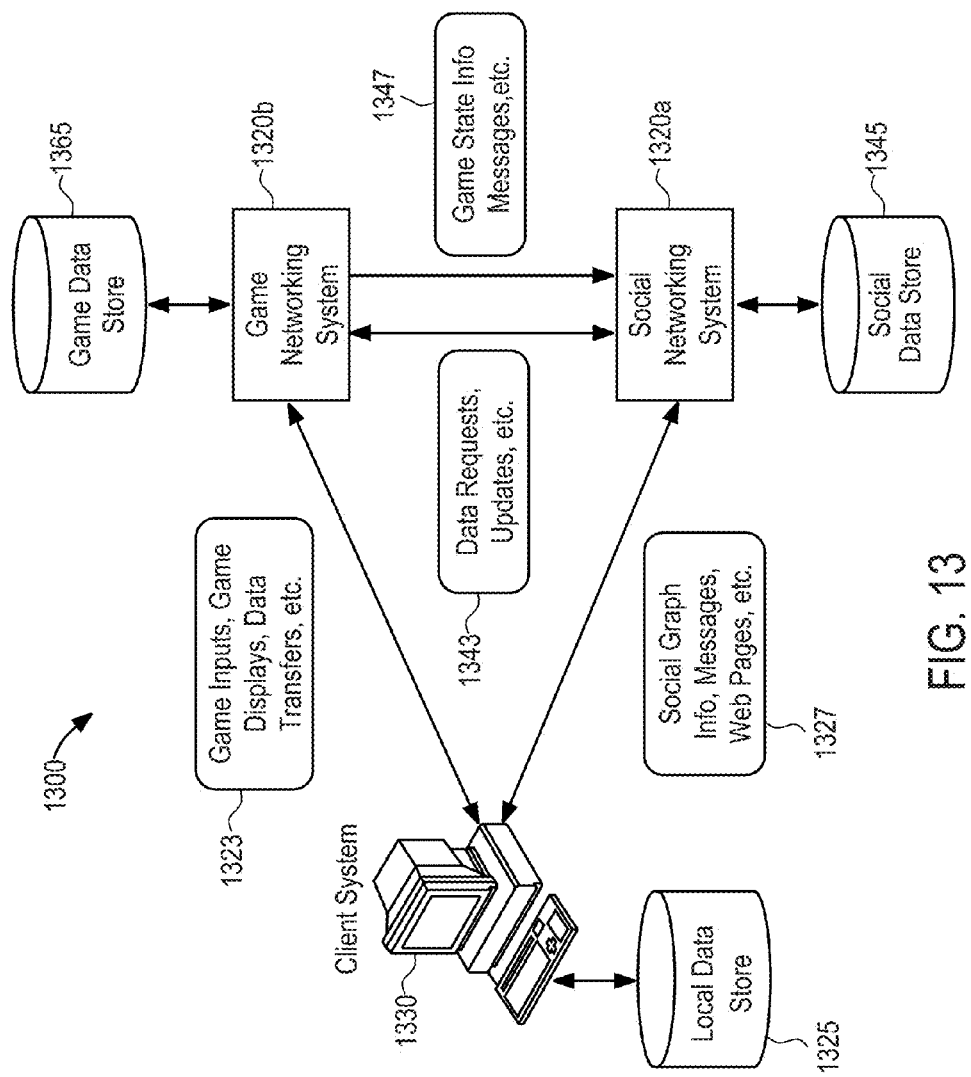
FIG. 13 illustrates an example data flow between example components of the example system of FIG. 1, according to some embodiments.

FIG. 13 illustrates an example data flow between example components of an example system 1300. One or more of the components of the example system 1300 may correspond to one or more of the components of the example system 100. In some embodiments, system 1300 includes a client system 1330, a social networking system 1320a, and a game networking system 1320b. The components of system 1300 can be connected to each other in any suitable configuration, using any suitable type of connection. The components may be connected directly or over any suitable network. The client system 1330, the social networking system 1320a, and the game networking system 1320b may have one or more corresponding data stores such as the local data store 1325, the social data store 1345, and the game data store 1365, respectively.

The client system 1330 may receive and transmit data 1323 to and from the game networking system 1320b. This data can include, for example, a web page, a message, a game input, a game display, a HTTP packet, a data request, transaction information, and other suitable data. At some other time, or at the same time, the game networking system 1320b may communicate data 1343, 1347 (e.g., game state information, game system account information, page info, messages, data requests, updates, etc.) with other networking systems, such as the social networking system 1320a (e.g., Facebook, Myspace, etc.). The client system 1330 can also receive and transmit data 1327 to and from the social networking system 1320a. This data can include, for example, web pages, messages, social graph information, social network displays, HTTP packets, data requests, transaction information, updates, and other suitable data.

Communication between the client system 1330, the social networking system 1320a, and the game networking system 1320b cart occur over any appropriate electronic communication medium or network using any suitable communications protocols. For example, the client system 1330, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1320b, the BLOB containing the game state for the instance corresponding to the player may be transmitted to the client system 1330 for use by a client-side executed object to process. In some embodiments, the client-side executable is a FLASH-based game, which can de-serialize the game state data in the BLOB. As a player plays the game, the game logic implemented at the client system 1330 maintains and modifies the various game state parameters locally. The client-side game logic may also batch game events, such as mouse clicks, and transmit these events to the game networking system 1320*b*. Game networking system 1320*b* may itself operate by retrieving a copy of the BLOB from a database or an intermediate memory cache (memcache) layer. The game networking system 1320*b* can also de-serialize the BLOB to resolve the game state parameters and execute its own game logic based on the events in the batch file of events transmitted by the client to synchronize the game state on the server side. The game networking system 1320*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1330. For example, a client application downloaded to the client system 1330 may operate to serve a set of web pages to a player. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media player plug-in. In some embodiments, one or more described web pages is associated with or accessed by the social networking system 1320*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1330, either caused by an action of a game player or by the game logic itself, the client system 1330 may need to inform the game networking system 1320*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the player, or the application files. In some embodiments, the client system 1330 may include a Flash client. The Flash client may be configured to receive and run Flash application or game object code from any suitable networking system (such as, for example, the social networking system 1320*a* or the game networking system 1320*b*). In some embodiments, the Flash client is run in a browser client executed on the client system 1330. A player can interact with Flash objects using the client system 1330 and the Flash client. The Flash objects can represent a variety of in-game objects. Thus, the player may perform various in-game actions on various in-game objects by making various changes and updates to the associated Flash objects.

In some embodiments, in-game actions are initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In some embodiments, when the player makes a change to a Flash object representing an in-game object, the client-executed game logic may update one or more game state parameters associated with the in-game object. To ensure synchronization between the Flash object shown to the player at the client system 1330, the Flash client may send the events that caused the game state changes to the in-game object to the game networking system 1320*b*. However, to expedite the processing and hence the speed of the overall gaming experience, the Flash client may collect a batch of some number of events or updates into a batch file. The number of events or updates may be determined by the Flash client dynamically or determined by the game networking system 1320*b* based on server loads or other factors. For example, client system 1330 may send a batch file to the game networking system 1320*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the game play of a player or in response to the game engine (e.g., based on the game logic). In some embodiments, an application data update occurs when the value of a specific application datum is changed.

In some embodiments, when a player plays a virtual game on the client system 1330, the game networking system 1320*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1320*b* may retrieve the corresponding BLOB from the database to determine the most-recent values of the game-related data. In some embodiments, while a player is playing the virtual game, the game networking system 1320*b* also loads the corresponding BLOB into a memory cache so that the game system may have faster access to the BLOB and the game-related data contained therein.

The following statements describe various embodiments.

Statement 1

A computer-implemented method for monitoring player interactions with branded virtual objects in a virtual environment, comprising generating a game instance of a computer-implemented multiplayer online game, the game instance being associated with a virtual environment of a first player;

providing a graphical user interface to a client device of a second player, the graphical user interface displaying at least one branded virtual object, the branded virtual object corresponding to a real-world brand; generating player engagement data based on the second player's interaction with the branded virtual object in the virtual environment of the first player; and storing the player engagement data of the second player in a database.

Statement 2

The computer-implemented method of statement 1, wherein generating player engagement data based on the second player's interaction with the branded virtual object in the virtual environment of the first player includes generating a branded object view count corresponding to the second player being presented with the at least one branded virtual object; and wherein storing the player engagement data of the second player in a database includes storing, in the database, the branded object view count corresponding to the at least one branded virtual object.

Statement 3

The computer-implemented method of statement 1, wherein generating player engagement data based on the second player's interaction with the branded virtual object in the virtual environment of the first player includes generating a branded object engagement count corresponding the second player's interaction with the at least one branded virtual object; and wherein storing the player engagement data of the second player in a database includes storing, in the database, the branded object engagement count corresponding to the at least one branded virtual object.

Statement 4

The computer-implemented method of statement 1, wherein the at least one branded virtual object corresponds to a virtual building in the virtual environment of the first player.

Statement 5

The computer-implemented method of statement 1, wherein the at least one branded virtual object corresponds to a virtual vehicle that traverses virtual roads in the virtual environment of the first player.

Statement 6

The computer-implemented method of statement 1, wherein the at least one branded virtual object corresponds to a virtual character that presents a message in the virtual environment of the first player.

Statement 7

The computer-implemented method of statement 1, wherein the at least one branded virtual object corresponds to a virtual character that presents a message upon interacting with a branded virtual object in the virtual environment of the first player.

Statement 8

The computer-implemented method of statement 1, wherein the at least one branded virtual object is associated with an advertising campaign for an advertiser to be presented to players of the computer-implemented multiplayer online game.

Statement 9

The computer-implemented method of statement 8, wherein storing the player engagement data of the second player in a database includes storing, in the database, the player engagement data of the second player in association with the advertising campaign.

Statement 10

The computer-implemented method of statement 8, further comprising receiving a request to obtain advertising analysis data for the advertising campaign from the advertiser; generating the advertising analysis data for the advertising campaign by aggregating player engagement data from a plurality of players that interacted with the at least one virtual object; and providing the advertising analysis data for the advertising campaign to the advertiser, Statement 11

A system to monitoring player interactions with branded virtual objects in a virtual environment, comprising a processor-implemented game engine to generate a game instance of a computer-implemented multiplayer online game, the game instance being associated with a virtual environment of a first player; provide a graphical user interface to a client device of a second player, the graphical user interface displaying at least one branded virtual object, the branded virtual object corresponding to a real-world brand; generate player engagement data based on the second player's interaction with the branded virtual object in the virtual environment of the first player; and store the player engagement data of the second player in a database.

Statement 12

The system of statement 11, wherein when generating player engagement data based on the second player's interaction with the branded virtual object in the virtual environment of the first player, the processor-implemented game engine is configured to generate a branded object view count corresponding to the second player being presented with the at least one branded virtual object; and wherein when storing the player engagement data of the second player in a database, the processor-implemented game engine is configured to store, in the database, the branded object view count corresponding to the at least one branded virtual object.

Statement 13

The system of statement 11, wherein when generating player engagement data based on the second player's interaction with the branded virtual object in the virtual environment of the first player, the processor-implemented game engine is configured to generate a branded object engagement count corresponding the second player's interaction with the at least one branded virtual object; and wherein when storing the player engagement data of the second player in a database, the processor-implemented game engine is configured to store, in the database, the branded object engagement count corresponding to the at least one branded virtual object.

Statement 14

The system of statement 11, wherein the at least one branded virtual object corresponds to a virtual building in the virtual environment of the first player.

Statement 15

The system of statement 11, wherein the at least one branded virtual object corresponds to a virtual vehicle that traverses virtual roads in the virtual environment of the first player.

Statement 16

The system of statement 11, wherein the at least one branded virtual object corresponds to a virtual character that presents a message in the virtual environment of the first player.

Statement 17

The system of statement 11, wherein the at least one branded virtual object corresponds to a virtual character that presents a message upon interacting with a branded virtual object in the virtual environment of the first player.

Statement 18

The system of statement 11, wherein the at least one branded virtual object is associated with an advertising campaign for an advertiser to be presented to players of the computer-implemented multiplayer online game.

Statement 19

The system of statement 18, wherein when storing the player engagement data of the second player in a database, the processor-implemented game engine is configured to store, in the database, the player engagement data of the second player in association with the advertising campaign.

Statement 20

The system of statement 18, wherein the processor-implemented game engine is configured to receive a request to obtain advertising analysis data for the advertising campaign from the advertiser; generate the advertising analysis data for the advertising campaign by aggregating player engagement data from a plurality of players that interacted with the at least one virtual object; and provide the advertising analysis data for the advertising campaign to the advertiser.

Statement 21

A machine-readable storage medium storing instructions which, when performed by a machine, cause the machine to generate a game instance of a computer-implemented multi-player online game, the game instance being associated with a virtual environment of a first player; provide a graphical user interface to a client device of a a second player, the graphical user interface displaying at least one branded virtual object, the branded virtual object corresponding to a real-world brand; generate player engagement data based on the second player's interaction with the branded virtual object in the virtual environment of the first player; and store the player engagement data of the second player in a database.

Figure 14:
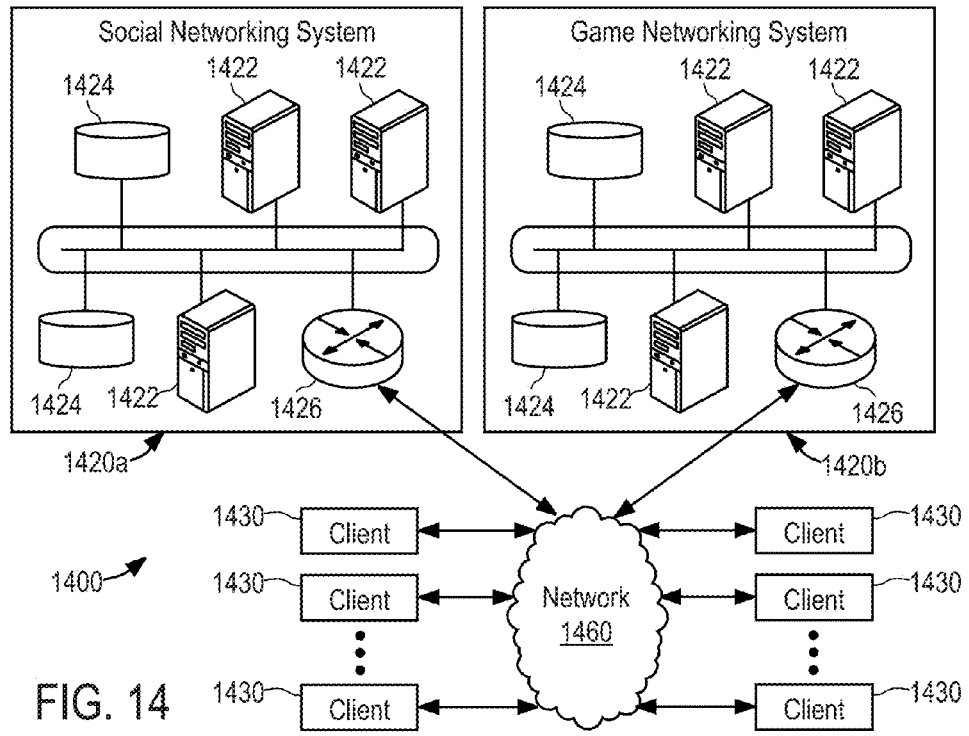
FIG. 14 illustrates an example network environment, in which various example embodiments may operate, according to some embodiments.

Various embodiments may operate in a wide area network environment, such as the Internet, including multiple network addressable systems. FIG. 14 illustrates an example network environment 1400, in which various example embodiments may operate. Network cloud 1460 generally represents one or more interconnected networks, over which the systems and hosts described herein can communicate. Network cloud 1460 may include packet-based wide area networks (such as the Internet), private networks, wireless networks, satellite networks, cellular networks, paging networks, and the like. As FIG. 14 illustrates, various embodiments may operate in a network environment 1400 comprising one or more networking systems, such as a social networking system 1420a, a game networking system 1420b, and one or more client systems 1430. The components of the social networking system 1420a and the game networking system 1420b operate analogously; as such, hereinafter they may be referred to simply as the networking system 1420. The client systems 1430 are operably connected to the network environment 1400 via a network service provider, a wireless carrier, or any other suitable means.

The networking system 1420 is a network addressable system that, in various example embodiments, comprises one or more physical servers 1422 and data stores 1424. The one or more physical servers 1422 are operably connected to computer network cloud 1460 via, by way of example, a set of routers and/or networking switches 14126. In an example embodiment, the functionality hosted by the one or more physical servers 1422 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1422 may host functionality directed to the operations of the networking system 1420. Hereinafter servers 1422 may be referred to as server 1422, although the server 1422 may include numerous servers hosting, for example, the networking system 1420, as well as other content distribution servers, data stores, and databases. Data store 1424 may store content and data relating to, and enabling, operation of, the networking system 1420 as digital data objects. A data object, in some embodiments, is an item of digital information typically stored or embodied in a data file, database, or record, Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 1424 corresponds to one or more of a variety of separate and integrated databases, such as relational databases and object-oriented databases, that maintain information as an integrated collection of logically related records or files stored on one or more physical systems. Structurally, data store 1424 may generally include one or more of a large class of data storage and management systems. In some embodiments, data store 1424 may be implemented by any suitable physical system(s) including components, such as one or more database servers, mass storage media, media library systems, storage area networks, data storage clouds, and the like. In one example embodiment, data store 1424 includes one or more servers, databases (e.g., MySQL), and/or data warehouses. Data store 1424 may include data associated with different networking system 1420 users and/or client systems 1430.

The client system 1430 is generally a computer or computing device including functionality for communicating (e.g., remotely) over a computer network. The client system 1430 may be a desktop computer, laptop computer, personal digital assistant (PDA), in- or out-of-car navigation system, smart phone or other cellular or mobile phone, or mobile gaming device, among other suitable computing devices. Client system 1430 may execute one or more client applications, such as a Web browser.

When a user at a client system 1430 desires to view a particular webpage (hereinafter also referred to as target structured document) hosted by the networking system 1420, the user's web browser, or other document rendering engine or suitable client application, formulates and transmits a request to the networking system 1420. The request generally includes a URL or other document identifier as well as metadata or other information. By way of example, the request may include information identifying the user, a timestamp identifying when the request was transmitted, and/or location information identifying a geographic location of the user's client system 1430 or a logical network location of the user's client system 1430.

Although the example network environment 1400 described above and illustrated in FIG. 14 is described with respect to the social networking system 1420a and the game networking system 1420b, this disclosure encompasses any suitable network environment using any suitable systems. For example, a network environment may include online media systems, online reviewing systems, online search engines, online advertising systems, or any combination of two or more such systems.

Figure 15:
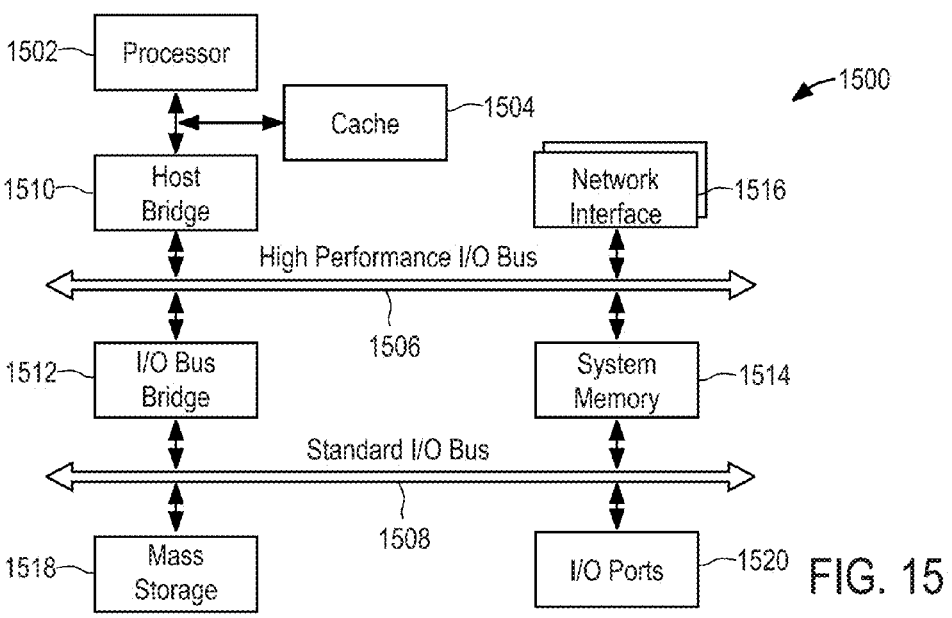
FIG. 15 illustrates an example computing system architecture, which may be used to implement one or more of the methodologies described herein, according to some embodiments.

FIG. 15 illustrates an example computing system architecture, which may be used to implement a server 1422 or a client system 1430. In one embodiment, the hardware system 1500 comprises a processor 1502, a cache memory 1504, and one or more executable modules and drivers, stored on a tangible computer-readable storage medium, directed to the functions described herein. Additionally, the hardware system 1500 may include a high performance input/output (I/O) bus 1506 and a standard I/O bus 1508. A host bridge 1510 may couple the processor 1502 to the high performance I/O bus 1506, whereas the I/O bus bridge 1512 couples the two buses 1506 and 1508 to each other. A system memory 1514 and one or more network/communication interfaces 1516 may couple to the bus 1506. The hardware system 1500 may further include video memory (not shown) and a display device coupled to the video memory. Mass storage 1518 and I/O ports 1520 may couple to the bus 1508. The hardware system 1500 may optionally include a keyboard, a pointing device, and a display device (not shown) coupled to the bus 1508. Collectively, these elements are intended to represent a broad category of computer hardware systems.

The elements of the hardware system 1500 are described in greater detail below. In particular, the network interface 1516 provides communication between the hardware system 1500 and any of a wide range of networks, such as an Ethernet (e.g., IEEE 802.3) network, a backplane, etc. The mass storage 1518 provides permanent storage for the data and programming instructions to perform the above-described functions implemented in servers 1422 of FIG. 14, whereas system memory 1514 (e.g., DRAM) provides temporary storage for the data and programming instructions when executed by the processor 1502. I/O ports 1520 are one or more serial and/or parallel communication ports that provide communication between additional peripheral devices, which may be coupled to the hardware system 1500.

The hardware system 1500 may include a variety of system architectures and various components of the hardware system 1500 may be rearranged. For example, cache memory 1504 may be on-chip with the processor 1502. Alternatively, the cache memory 1504 and the processor 1502 may be packed together as a "processor module," with processor 1502 being referred to as the "processor core." Furthermore, certain embodiments of the present disclosure may neither require nor include all of the above components. For example, the peripheral devices shown coupled to the standard I/O bus 1508 may couple to the high performance I/O bus 1506. In addition, in some embodiments, only a single bus may exist, with the components of the hardware system 1500 being coupled to the single bus. Furthermore, the hardware system 1500 may include additional components, such as additional processors, storage devices, or memories.

An operating system manages and controls the operation of the hardware system 1500, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
generating a game instance of a computer-implemented multiplayer online game, the game instance being associated with a virtual environment of a first player;
based on advertising campaign budget data, causing at least one branded virtual object to be displayed for selection by the first player, the branded virtual object representative of a real-world entity providing a real-world activity related to goods or services provided by the real-world entity;
in the event of the branded virtual object being selected by the first player, updating the virtual environment of the first player to include the branded virtual object;
causing a graphical user interface to be displayed on a client device of a second player to allow the second player to visit the virtual environment of the first player including the branded virtual object; and
upon interaction by the second player with the branded virtual object, causing a virtual activity to be performed in the virtual environment, the virtual activity corresponding to the real world activity associated with the real-world entity and wherein the second player expends a determinable amount of character energy when interacting with the branded virtual object and the first player collects virtual currency when interacting with the branded virtual object.

2. The method of claim 1, wherein the real-world activity comprises the real-world entity providing goods to customers and the virtual activity comprises vending corresponding virtual goods to virtual characters in the virtual environment.

3. The method of claim 1, wherein the branded virtual object is a virtual building for placement in the virtual environment, the virtual building corresponding to a real-world building and the real-world activity being identifiable by the structure of the real-world building.

4. The method of claim 1, wherein the branded virtual object corresponds to a virtual vehicle configured to traverse virtual roads of the virtual environment, the virtual activity being virtual driving of the virtual vehicle in the virtual environment.

5. The method of claim 1, comprising auctioning an opportunity to present the branded virtual object and the associated virtual activity to the first player.

6. The method of claim 5, comprising:
accessing a database including a plurality of branded virtual objects;
retrieving a branded virtual object corresponding to a successful bidder bidding in an auction for presentment of the branded virtual object to players in the multiplayer online game; and
presenting the branded virtual object to the first player for selection and placement in the virtual environment of the first player.

7. The method of claim 1, comprising monitoring removal of a branded virtual object by the first player and updating the virtual environment of the first player so that the branded virtual object is no longer viewable in the virtual environment of the first player.

8. The method of claim 1, comprising monitoring the interaction with the branded virtual object by each of a plurality players visiting the virtual environment of the first player and updating a branded object count in a database.

9. The method of claim 1, wherein the multiplayer online game includes a plurality of un-branded virtual objects each having a predefined shape and dimension for selective placement in the virtual environment, each branded virtual object having associated measurement parameters corresponding to an-unbranded virtual object.

10. The method of claim 1, comprising causing a plurality of branded virtual objects to be presented to the first player, each branded virtual object corresponding to a different real-world entity.

11. The method of claim 10, wherein at least two branded virtual objects of the plurality of branded virtual objects corresponds to competing real-world entities that perform a substantially similar real-world activity.

12. The method of claim 1, wherein the real-world activity is vending a consumable good to a person and the corresponding virtual activity is vending a virtual consumable good to a virtual character.

13. The method of claim 1, comprising providing in-game rewards to the first player in the event of the second player interacting with the branded virtual object in the virtual environment of the first player.

14. The method of claim 1, wherein the virtual environment includes a plurality of different object categories, each object category corresponding to a different virtual activity.

15. The method of claim 1, comprising:
identifying placement constraints associated with two competing real-world entities; and
restricting the proximity of placement in the virtual environment of the virtual objects from the two competing entities based on the placement constraints.

16. The method of claim 1, comprising:
monitoring if the first player identifies an unbranded virtual object in the virtual environment of the first player; and
presenting at least one branded virtual object to the first player for replacement of the unbranded virtual object in the virtual environment.

17. A gaming system comprising:
at least one database to store a plurality of game instances and at least one branded virtual object; and
at least one processor-implemented game engine configured to:
access the database to generate a game instance of a computer-implemented multiplayer online game, the game instance being associated with a virtual environment of a first player;
based on advertising campaign budget data, cause the branded virtual object to be displayed for selection by the first player, the branded virtual object representative of a real-world entity providing a real-world activity related to goods or services provided by the real-world entity;
in the event of the branded virtual object being selected by the first player, update the virtual environment of the first player in the database to include the branded virtual object;
cause a graphical user interface to be displayed on a client device of a second player to allow the second player to visit the virtual environment of the first player including the branded virtual object; and
upon interaction by the second player with the branded virtual object, cause a virtual activity to be performed in the virtual environment, the virtual activity corresponding to the real world activity associated with the real-world entity and wherein the second player expends a determinable amount of character energy when interacting with the branded virtual object and the first player collects virtual currency when interacting with the branded virtual object.

18. The system of claim 17, wherein an opportunity to present the branded virtual object and the associated virtual activity to the first player is auctioned.

19. A non-transitory machine-readable storage medium comprising instructions which, when executed by one or more processors perform operations comprising:
generating a game instance of a computer-implemented multiplayer online game, the game instance being associated with a virtual environment of a first player;
based on advertising campaign budget data, causing at least one branded virtual object to be displayed for selection by the first player, the branded virtual object representative of a real-world entity providing a real-world activity related to goods or services provided by the real-world entity;
in the event of the branded virtual object being selected by the first player, updating the virtual environment of the first player to include the branded virtual object;
causing a graphical user interface to be displayed on a client device of a second player to allow the second player to visit the virtual environment of the first player including the branded virtual object; and upon interaction by the second player with the branded virtual object, causing a virtual activity to be performed in the virtual environment, the virtual activity corresponding to the real world activity associated with the real-world entity and wherein the second player expends a determinable amount of character energy when interacting with the branded virtual object and the first player collects virtual currency when interacting with the branded virtual object.

20. The non-transitory machine-readable storage medium of claim 19, wherein an opportunity to present the branded virtual object and the associated virtual activity to the first player is auctioned.

* * * * *